(12) United States Patent
Lu et al.

(10) Patent No.: US 10,084,602 B2
(45) Date of Patent: Sep. 25, 2018

(54) DYNAMIC TOKEN AND A WORKING METHOD THEREOF

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 174 days.

(21) Appl. No.: 15/108,788

(22) PCT Filed: Jan. 5, 2015

(86) PCT No.: PCT/CN2015/070091
§ 371 (c)(1),
(2) Date: Jun. 29, 2016

(87) PCT Pub. No.: WO2015/101350
PCT Pub. Date: Jul. 9, 2015

(65) Prior Publication Data
US 2016/0330028 A1    Nov. 10, 2016

(30) Foreign Application Priority Data

Jan. 6, 2014 (CN) .......................... 2014 1 0004757

(51) Int. Cl.
*G06F 21/00* (2013.01)
*H04L 9/32* (2006.01)
*H04L 9/08* (2006.01)

(52) U.S. Cl.
CPC .......... *H04L 9/3228* (2013.01); *H04L 9/0872* (2013.01)

(58) Field of Classification Search
CPC ... H04L 9/3228; H04L 9/0877; H04L 9/3234; H04L 29/06802; H04L 63/0853
See application file for complete search history.

(56) References Cited

U.S. PATENT DOCUMENTS

| 6,148,404 | A | 11/2000 | Yatsukawa | |
|---|---|---|---|---|
| 2012/0210408 | A1* | 8/2012 | Lu | ........................ H04L 63/0846 726/6 |
| 2013/0198519 | A1* | 8/2013 | Marien | .................... G06F 21/34 713/172 |
| 2014/0052995 | A1* | 2/2014 | Hu | .......................... G06F 21/45 713/184 |

* cited by examiner

*Primary Examiner* — Brandon S Hoffman
*Assistant Examiner* — Helai Salehi
(74) *Attorney, Agent, or Firm* — Hammer & Associates, P.C.

(57) ABSTRACT

A working method of a dynamic token, including the steps of grouping, by the dynamic token, the second hash data to obtain a plurality of byte groups, transforming respective byte groups into corresponding binary data by shifting and combining the bytes contained in respective byte groups; performing modulo operation on a first preset value by using sum of all the binary data obtained by transforming to a modulo result, performing modulo operation on a second preset value by using the obtained modulo result so as to obtain the first bit interception result. According to this working method, on the basis of different purpose codes, an authentication server authenticates the dynamic passwords applicable to each application scenarios, reducing the risk of keys used for generating dynamic passwords being stolen, improving the security of a token authentication system.

24 Claims, 5 Drawing Sheets

DYNAMIC TOKEN AND A WORKING METHOD THEREOF

FIELD OF THE INVENTION

The present invention is related to a dynamic token and a working method thereof, a method for identity verification, a system and a device thereof, which belongs to information security field.

PRIOR ART

Dynamic token is a device for generating a dynamic password, which is widely used in application fields such as e-bank, telecommunication operator and e-business, etc. The dynamic password generated by the dynamic token can be used for identity verification, which improves security of identification effectively.

The prior art has following disadvantages: the dynamic token generates a dynamic password upon a seed key, which is a unique key information stored in the dynamic token; once the seed key is stolen, the security of identity verification cannot be assured.

SUMMARY OF THE INVENTION

The object of the present invention provides a dynamic token and a working method thereof, a method for identity verification, a system and a device, which can reduce a risk that a key for generating a dynamic password is being stolen, therefore security of a token verification system is improved.

Therefore, according to the first aspect of the present invention, there is provided a method for identity verification in a system including a dynamic token, a client side and an authentication server, wherein the method comprises following steps:

receiving, by the authentication server, a first operating request from the client side, generating a first challenge code, storing the first challenge code as information corresponding to identification in the first operating request and sending the first challenge code to the client side;

displaying, by the client side, the first challenge code;

obtaining, by the dynamic token, a first challenge code input by a user; performing hash operation on a working key and a first usage code, which are stored in the dynamic token, upon detecting a first press key triggered; taking a first hash data obtained as a first computing key; performing hash operation on the first computing key, the first time information and the first challenge code to obtain a second hash data;

performing, by the dynamic token, bit interception/truncation on the second hash data, taking a first bit interception result (truncated result) obtained as a first verification password to display;

obtaining, by the client side, the first verification password input by a user, generating a first verification request including the first verification password and identification information, sending the first verification request to the authentication server;

obtaining, by the authentication server, the identity information in the first verification request, searching for a working key and a first challenge code which are corresponding to the identity information in the first verification request, performing hash operation on the working key found by searching and the self-stored first usage code, taking a third hash data obtained as a second computing key, performing hash operation on the second computing key, a second time information and the first challenge code found by searching to obtain a fourth hash data; and performing, by the authentication server, bit interception on the fourth hash data, taking a second bit interception result obtained as a first verification password obtained by computing, determining whether the first verification password obtained by computing matches the first verification password obtained from the first verification request; if yes, sending information of successful verification to the client side; otherwise, sending information of failed verification to the client side.

According to the second aspect of the present invention, there is provided a working method of a dynamic token which includes following steps:

A1) waiting, by the dynamic token, for a user to trigger a press key;

A2) when the press key of the dynamic token is triggered, determining, by the dynamic token, the press key triggered; if the press key triggered is a first press key, executing Step A3; if the press key triggered is a second press key, executing Step A5;

A3) obtaining, by the dynamic token, a logon challenge code input by the user, performing hash operation on a working key and a first usage code, which are stored in the dynamic token; taking a first hash data obtained as a first computing key, performing hash operation on the first computing key, a first time information and a logon challenge code to obtain a second hash data;

A4) performing, by the dynamic token, bit interception on the second hash data, displaying a first bit interception result obtained as a logon password, going back to Step A1;

A5) obtaining, by the dynamic token, a signature challenge code input by the user, performing hash operation on the stored working key and a second usage code, which are stored in the dynamic token, taking the third hash data obtained as a second computing key, performing hash operation on the second computing key, the second time information and the signature challenge code to obtain a fourth hash data; and A6) performing, by the dynamic token, bit interception on the fourth hash data, displaying a second bit interception result obtained as signature password, going back to Step A1.

According to the third aspect of the present invention, there is provided a working method for authentication server, which includes following steps:

C1) waiting, by the authentication server, for a request from the client side;

C2) after receiving the request from the client side, determining, by the authentication server, the received request,
if the request is a logon request, executing C3;
if the request is a logon verification request, executing C4;
if the request is a signature request, executing C6;
if the request is a signature verification request, executing C7;

C3) generating, by the authentication server, a logon challenge code, storing the logon challenge code as information corresponding to the identity information in the logon request, sending the logon challenge code to the client side, going back to Step C1;

C4) searching, by the authentication sever, the working key corresponding to the identity information and the logon challenge code in the logon verification request, performing hash operation on the working key found by searching and its self-stored first usage code, taking a twelfth hash data as a fourth computing key, performing hash operation on the fourth computing key and a fifth time information and the logon challenge code obtained by searching to obtain a thirteenth hash data;

C5) performing, by the authentication server, bit interception on the thirteenth hash data, takes a seventh bit interception result obtained as the logon password obtained by computing; determining whether the logon password obtained by computing matches a logon password obtained from the logon verification request, if yes, sending information of successful authentication to the client side and going back to Step C1; otherwise, sending information of failed authentication to the client side and going back to Step C1;

C6) generating, by the authentication server, a signature challenge code, storing the signature challenge code as information corresponding to the identity information in the signature request and sending the signature challenge code to the client side; go back to Step C1;

C7) searching, by the authentication server, for the working key corresponding to the identity information in the signature verification request and the signature challenge code, performing hash operation on the working key found by searching and its self-stored second usage code and takes a fourteenth hash data obtained as a fifth computing key, performing hash operation on the fifth computing key, a sixth time information and the signature challenge code obtained by searching to obtain a fifth hash data;

C8) performing, by the authentication server, bit interception on a fifteenth hash data, taking an eighth bit interception result obtained as a signature password obtained by computing, determining whether the signature password obtained by computing matches the signature password obtained from a signature password obtained from the signature authentication request, if yes, sending information of successful verification to the client side and going back to Step C1; otherwise, sending information of failed verification to the client side and going back to Step C1.

According to the fourth aspect of the present invention, there is provided an identity verification system, which comprises a dynamic token, a client side and an authentication server, wherein the authentication server comprises:
a first receiving module configured to receive a first operating request from the client side;
a first generating module configured to generate a first challenge code, store the first challenge code as information corresponding to the identity information in the first operating request after receiving the first operating request; and
a first sending module configure to send the first challenge code generated by the first generating module to the client side;

the client side comprises:
a second sending module configured to send the first operating request to the authentication server;
a second receiving module configured to receive a first challenge code from the authentication server; and
a first displaying module configured to display the first challenge code;

the dynamic token comprises:
a first storing module configured to store a working key and a first usage code;
a first obtaining module configured to obtain a first challenge code input by a user;
a detecting module configured to detect a press key;
a first hash module configured to, when the detecting module detects that a first press key is triggered, perform hash operation on the working key and the first usage code which are stored by the first storing module to obtain a first hash data;
a second hash module configured to take the first hash data obtained by hash operation performed by the first hash module as a first working key, perform hash operation on the first computing key, the first time information and the first challenge code obtained by the first obtaining module to obtain a second hash data;
a first bit interception module configured to perform bit interception on the second hash data obtained by hash operation performed by the second hash module to obtain a first bit interception result; and
a second displaying module configured to take the first bit interception result obtained by bit interception performed by the first bit interception module as a first verification password to display;

the client side further comprises:
a second obtaining module configured to obtain the first verification password input by the user;
a second generating module configured to generate the first verification request including the identity information and the first verification password;
the second sending module configured to send the first verification request generated by the second generating module to the authentication server; and
the first receiving module in the authentication server is further configured to receive the first authentication request from the client side;

the authentication server further comprises:
a second storing module configured to store the first usage code;
a third obtaining module configured to obtain the identity information in the first verification request received by the first receiving module;
a searching module configured to search the working key corresponding to the identity information in the first verification request and the first challenge code;
a third hash module configured to perform hash operation on the working key found by search and the first usage cod stored by the second storing module to obtain a third hash data;
a fourth hash module configure to take the third hash data obtained by the third hash module as a second computing key, perform hash operation on the second computing key, the second time information and the first challenge code found by searching to obtain a fourth hash data; a second bit interception module configured to perform bit interception on the fourth hash data obtained by hash operation performed by the fourth hash module to obtain a second bit interception result; and
a first determining module configured to take the second bit interception result obtained by the second bit interception module as the first verification password obtained by computing, determining whether the first verification password obtained by computing matches the first verification password obtained from the first verification request,
in which the first sending module configured to send information of successful verification to the client side when the first determining module determines that the first verification password obtained by computing matches the first verification password obtained from the first verification request; send information of failed verification to the client side when the first determining module determines that the first verification password obtained by computing does not match the first verification password obtained from the first verification request; and the second receiving module in the client side further configured to receive information of successful verification or information of failed verification from the authentication server.

According to the fifth aspect of the present invention, there is provided a dynamic token, wherein the dynamic token comprises:

a storing module configured to store a working key, a first usage code and a second usage code;

an obtaining module configured to obtain a logon challenge code and a signature challenge code input by the user;

a detecting module configured to detecting a press key;

a first determining module configured to, when the detecting module detects that a press key of the dynamic token is triggered, determine the press key triggered;

a first hash module configured to perform hash operation on the working key and the first usage code stored by the storing module to obtain a first hash data when the first determining module determines that the press key triggered is the first press key; perform hash operation on the working key and the second usage code stored by the storing module to obtain a third hash data when the first determining module determines that the press key being trigged is the second key;

a second hash module configured to take the first hash data, which is obtained by the hash operation performed by the first hash module, as the first computing key, perform hash operation on the first computing key, the first time information and the logon challenge code obtained by the obtaining module to obtain the second hash data; take the third hash data obtained by the first hash module as the second computing key, perform the second computing key, the second time information and the signature challenge code obtained by the obtaining module to obtain the fourth hash data;

a bit intercepting module configured to perform bit interception on the second hash data, which is obtained by the hash operation performed by the second hash module, to obtain the first bit interception result; perform bit interception on the fourth hash data obtained by the second hash module to obtain the second bit interception result; and a displaying module configured to take the first bit interception result, which is obtained by bit interception performed by the bit intercepting module, as the logon password to display; take the second interception result, which is obtained by bit interception performed by the bit interception module, as the signature password to display.

According to another aspect of the present invention, there is provided an authentication server, wherein the authentication server comprises:

a storing module configured to store a first usage code and a second usage code;

a receiving module configured to receive a request from a client side;

a first determining module configured to determine the request received by the receiving module;

a first generating module configured to generate a logon challenge code when the first determining module determines that the received request is a logon request, store the logon challenge code as information corresponding to the identity information in the logon request; generate a challenge code when the first determining module determines that the received request is the signature request, store the signature challenge code as information corresponding to the identity information in the signature request;

a sending module configured to send the logon challenge code and the signature challenge code which are generated by the first generating module to the client side;

a searching module configured to search for the working key and the logon challenge code, which are corresponding to the identity information in the logon verification request when the first determining module determines that the received request is the logon verification request; search for the working key and the signature challenge code which are corresponding to the identity information in the signature verification request when the first determining module determines that the received request is the signature verification request;

a first hash module configured to perform hash operation on the working key obtained by searching by the searching module and the first usage code stored by the storing module to obtain a twelfth hash data; perform hash operation on the working key obtained by searching by the searching module and the second usage code stored by the storing module to obtain a fourteenth hash data;

a second hash module configured to take the twelfth hash data, which is obtained by hash operation performed by the first hash module, as a fourth computing key, perform hash operation on the fourth computing key, the fifth time information and the logon challenge code, which is found by searching of the search module to obtain the thirteenth hash data; take the fourteenth hash data obtained by the hash operation performed by the first hash module as the fifth computing key, perform hash operation on the fifth computing key, the sixth time information and the searched signature challenge code to obtain the fifteenth hash data;

a bit interception module configured to perform bit interception operation on the thirteenth hash data, which is obtained by performing hash operation by the second hash module 1008, to obtain the seventh bit interception result; perform bit interception operation on the fifteenth hash data, which is obtained by performing hash operation by the second hash module, to obtain the eighth bit interception result; and a second determining module configured to take the seventh bit interception result, which is obtained by performing bit interception by the bit interception module, as a logon password obtained by computing, determine whether the logon password obtained by computing matches the logon password obtained in the logon verification request; take the eighth bit interception result, which is obtained by performing interception obtained by the bit interception module, as the signature password obtained by computing, determine whether the signature password obtained by computing matches the signature password obtained from the signature verification request, in which the sending module further is configured to send information of successful verification to the client side when the second determining module determines that the logon password obtained by computing matches the logon password obtained from the logon verification request; send information of failed verification to the client side when the second determining module determines that the logon password obtained by computing does not match the logon password obtained from the logon verification request; send information of successful verification to the client side when the second determining module determines that the signature obtained by computing matches the signature password obtained from the signature verification request; send information of failed verification to the client side when the second determining module determines that the signature obtained by computing does not match the signature password obtained from the signature verification request.

According to the present invention, the dynamic token generates different computing keys (calculation keys) upon different usage cods and generates dynamic passwords used for variety of application sites (application scenario) upon different computing keys; Correspondingly, an authentication server verifies dynamic passwords used in variety of application sites upon different usage codes, which reduces risks that the key used for generating a dynamic password is being stolen and improves security of a token verification system.

DETAILED DESCRIPTION OF PREFERRED EMBODIMENTS

The embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of protection of the present invention.

The technical solution of the present invention is applied in a token verification system including a dynamic token, a client side and an authentication server. In this case, the dynamic token is for generating a dynamic password; the authentication server is for obtaining the dynamic password generated by the dynamic token via the client side, verifying the dynamic password and sending a verification result to the client side and the verification result is displayed via the client side.

Embodiment 1

Embodiment 1 of the present invention provides the working method for the dynamic token and the authentication server included in the identity verification system described above.

Figure 1:
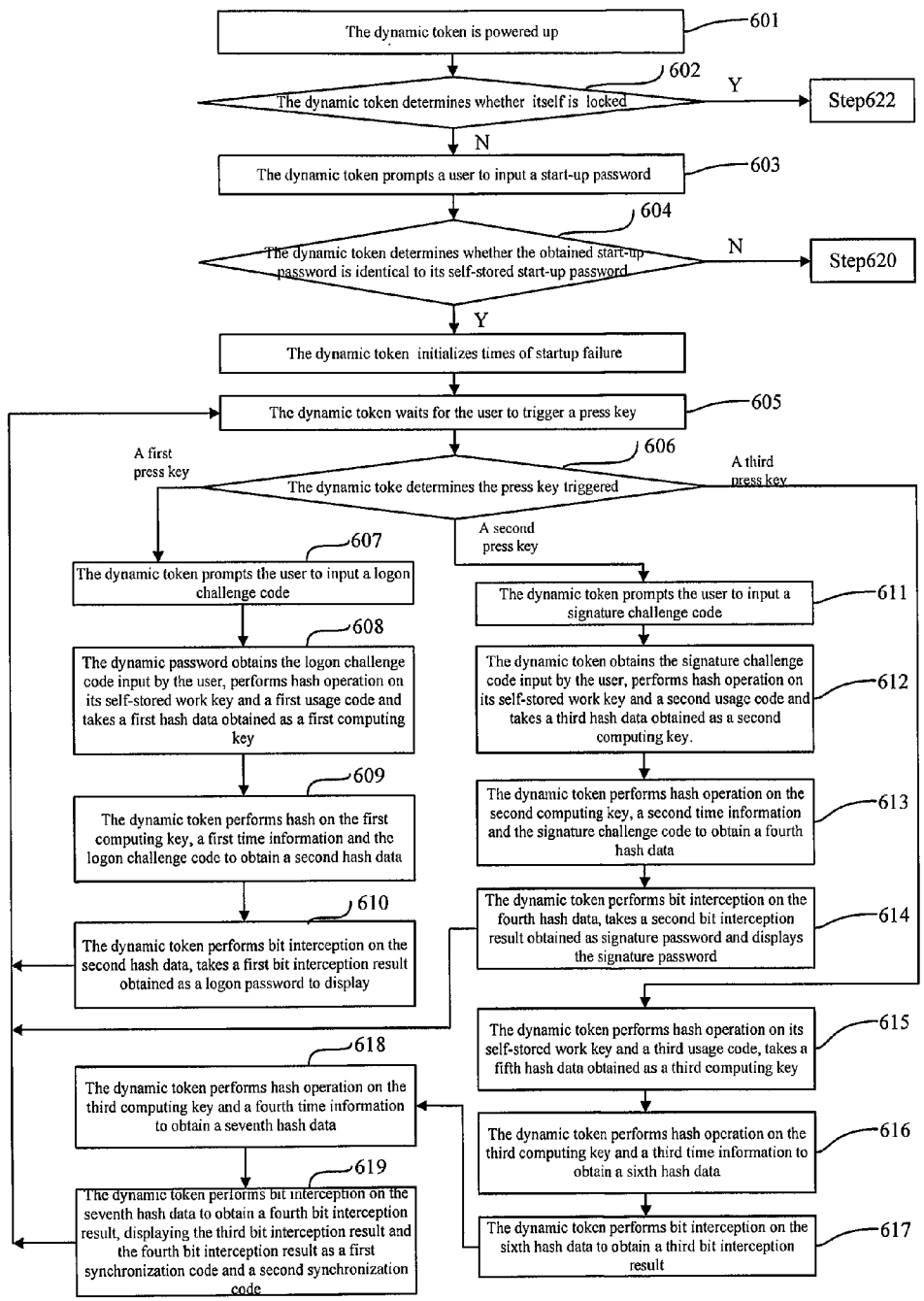
FIG. 1 and FIG. 2 present a flow chart of a working method for a dynamic token illustrated in Embodiment 1 of the present invention.
Figure 2:
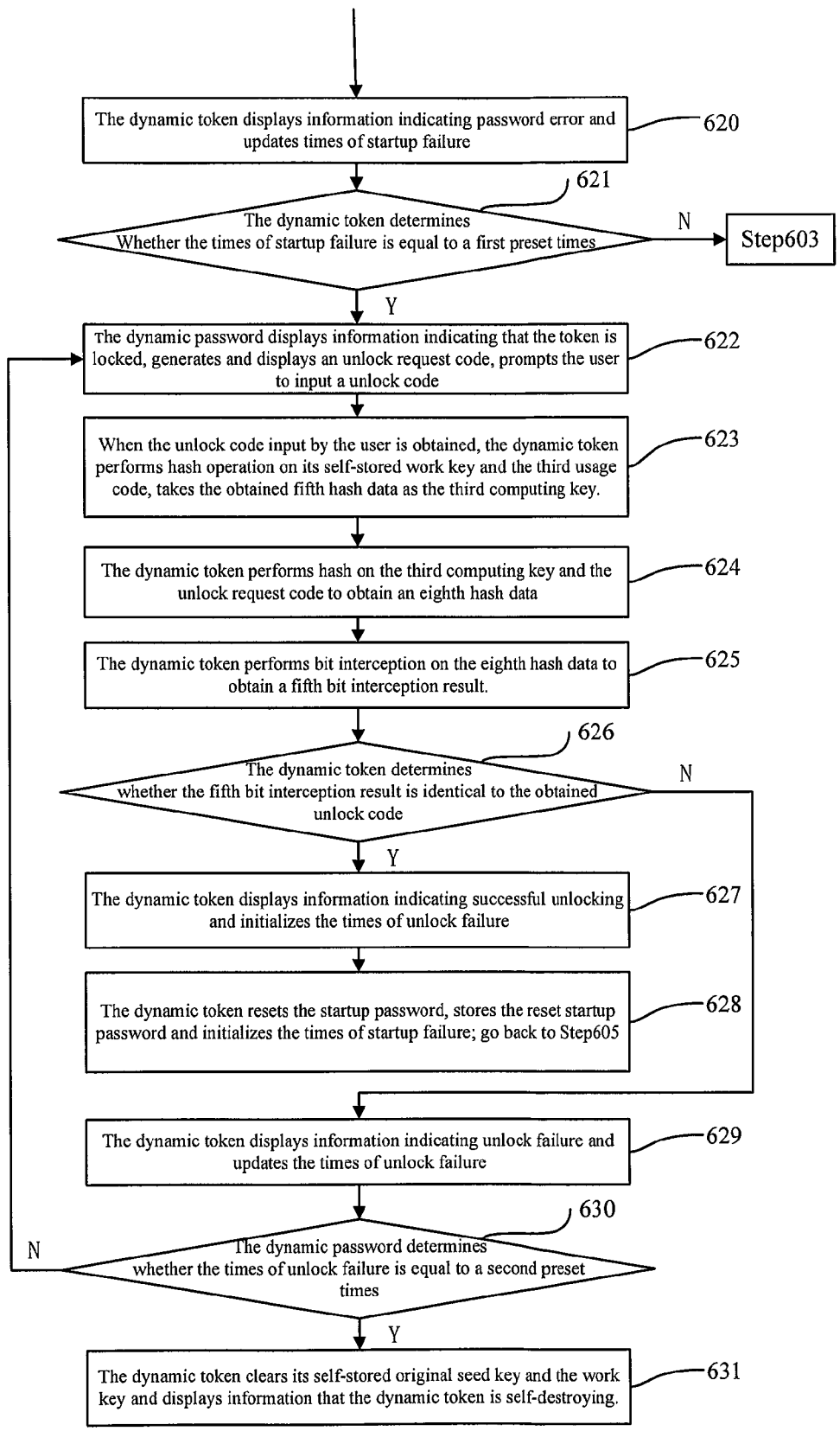

As shown in FIG. 1 and FIG. 2, the working method of the dynamic token of Embodiment 1 includes following steps.

Step 601, the dynamic token is powered up.

Step 602, the dynamic token determines whether the dynamic token itself is locked, if yes, execute Step 622; otherwise, execute Step 603.

Step 603, the dynamic token prompts a user to input a start-up password.

Step 604, when the start-up password input by the user is obtained, the dynamic token determines whether the obtained start-up password is identical to its self-stored start-up password, if yes, initialize times of startup failure and execute Step 605; otherwise, execute Step 620.

Step 605, the dynamic token waits for the user to trigger a press key.

Step 606, when the press key of the dynamic token is triggered, the dynamic toke determines the press key triggered, if the press key is a first press key, execute Step 607; if the press key the a second press key, execute Step 611; if the press key is a third press key, execute Step 615.

Step 607, the dynamic token prompts the user to input a logon challenge code;

Step 608, the dynamic password obtains the logon challenge code input by the user, performs hash operation on its working key and a first usage code, which are stored in the dynamic token, and takes a first hash data obtained as a first computing key.

Specifically, the dynamic token can combine its working key and the first usage code, which are stored in the dynamic token, to be a first data, fill the first data to obtain a first message, group the first message and perform iterative compression on obtained grouping data and obtains the first hash data.

In the present embodiment 1, the working key can be data with length of 32 bytes, the first usage code can be data with length of 4 bytes; the first hash data obtained by performing hash operation on the working key and the first usage code can be data with length of 32 bytes.

For example, in the dynamic token the first usage code of is "00000001"; the working key is "a26d180368a3775b810eb54193804a f4c5edc74d3a1dddca28ba700091e99b03"; the first hash data obtained by performing hash on the working key and the first usage code is "27AD795688C8 00C1FC2C1787FDDA3FB4E8A9108B538C96E666BB8 60B1FDA3E56".

Step 609, the dynamic token performs hash on the first computing key, a first time information and the logon challenge code to obtain a second hash data.

Specifically, the dynamic token can combine the first computing key, the first time information and the logon challenge code to be a second data, fill the second data to obtain a first message, group the second message and perform iterative compression on obtained grouping data and obtains the second hash data.

In the present embodiment 1, the first computing key can be data with length of 32 bytes, the first time information can be data with length of 6 bytes; the logon challenge code input by the user can be data with length of 6 bytes; the second hash data obtained by performing hash operation on the first computing key, the first time information and the logon challenge code can be data with length of 32 bytes.

For example, the first time information is "00000000015829CE"; the logon challenge code input by the user is "012345"; the first computing key is "27AD795688C800C1FC2C1787FDDA3FB4E8A9108B5 38C96E666BB860B1FDA3E56"; the second hash data obtained by performing computing by the dynamic token is "57f72a79575d05d01b647192c1fe2f72d593fe275ce35556 95f8e25684e38bec".

Step 610, the dynamic token performs bit interception/truncation on the second hash data, takes a first bit interception result (truncated result) obtained as a logon password and displays the logon password; go back to Step 605.

Specifically, the dynamic token can group the second hash data to obtain a plurality of byte groups, transform respective byte groups into corresponding binary data by shifting and combining the bytes contained in the byte groups; the dynamic token performs modulo operation on a first preset value by using sum of all the binary data obtained by transforming to obtain a modulo result, performs modulo operation on a second preset value by using the obtained modulo result and obtains the first bit interception result.

In the present embodiment 1, the second hash data is data with length of 32 bytes; the dynamic token can group the second hash data into 8 byte groups, each byte group contains 4 bytes, the 8 byte groups can be transformed into 8 binary data by shifting and combining the 4 bytes in respective byte groups. Further, the dynamic token obtains a result of adding all the 8 binary data, performs modulo operation on 232 by using the result to obtain a module result, performs modulo operation on 1000000 by using the obtained modulo result and obtains the first bit interception result.

For example, the dynamic token obtains the second hash data is "57f72a79575d05d01b647192c1fe2f72d593fe275ce35556 95f8e25684e38bec" by computing, the first bit interception is "126092", i.e. the logon password is "126092".

It should be noted that, after Step 610, the client side can obtain the logon password generated by the dynamic password, generate a logon verification request including the logon password and identity information and send the logon verification request to the authentication server.

Step 611, the dynamic token prompts the user to input a signature challenge code.

Step 612, the dynamic token obtains the signature challenge code input by the user, performs hash operation on its working key and a second usage code, which are stored in the dynamic token, and takes a third hash data obtained as a second computing key.

Specifically, the dynamic token can combine its working key and the second usage code, which are stored in the dynamic token, to be a third data, fill the third data to obtain a third information, group the third information and perform iterative compression on obtained grouping data and obtain the third hash data.

In the present embodiment 1, the working key can be data with length of 32 bytes, the second usage cod can be data with length of 4 bytes, the third hash data obtained by performing hash operation on the working key and the second usage code can be data with length of 32 bytes.

For example, the second usage code of the dynamic token is "00000002", the working key is "a26d180368a3775b810eb54193804af 4c5edc74d3a1dddca28ba700091e99b03"; the third hash data obtained by performing hash on the working key and the second usage code is "8D5828922FE BFC8597FC7768A5CD856B45C3A104119BDE8B0E9 A418D6A9AB768".

Step 613, the dynamic token performs hash operation on the second computing key, a second time information and the signature challenge code to obtain a fourth hash data.

Specifically, the dynamic token can combine the second computing key, the second time information and the signature challenge code input by the user to be a fourth data, fill the fourth data to obtain a fourth message, group the fourth message, perform iterative compression on obtained grouping data and obtain the fourth hash data.

In the present embodiment 1, the second computing key can be data with length of 32 bytes, the second time information can be data with length of 8 bytes, the signature challenge code input by the user can be data with length of 6 bytes, the fourth hash data obtained by performing hash operation on the second computing key, a second time information and the signature challenge code can be data with length of 32 bytes.

For example the second time information is"00000000015829CE", the signature challenge code input by the user is "012345", the second computing key is "8D5828922FEBFC8597FC7768A5CD856B45C3A1041 19BDE8B0E9A418D6A9AB768", the fourth hash data obtained by computing by the dynamic token is "228ff7a222fdf903b7c84926cebe47b42dc7d2e101da3e99 5dc402169a4b25da".

Step 614, the dynamic token performs bit interception on the fourth hash data, takes a second bit interception result obtained as signature password and displays the signature password; go back to Step 605.

Specifically, the dynamic token can group the fourth hash data to obtain a plurality of byte groups, transform respective byte groups into corresponding binary data by shifting and combining the bytes contained in the byte groups; the dynamic token performs modulo operation on the first preset value by using sum of all the binary data obtained by transforming to obtain a modulo result, performs modulo operation on the second preset value by using the obtained modulo result and obtains the second bit interception result.

In the present embodiment 1, the fourth hash data is data with length of 32 bytes; the dynamic token can group the second hash data into 8 byte groups, each byte group contains 4 bytes, the 8 byte groups can be transformed into 8 binary data by shifting and combining the 4 bytes in respective byte groups. Further, the dynamic token obtains a result of adding all the 8 binary data, performs modulo operation on 232 by using the result to obtain a modulo result, performs modulo operation on 1000000 by using the obtained modulo result and obtains the second bit interception result.

For example, the fourth hash data obtained by computing by the dynamic token is "228ff7a222fdf903b7c84926cebe47b42dc7d2e101da3e9 95dc402169a4b25da", the second bit interception result is "821929", i.e. the signature password is "821929".

It should be noted that, after Step 614, the client side obtains the signature password generated by the dynamic token, generates a signature verification request including the signature password and the identity information and sends the signature verification request to the authentication server.

Step 615, the dynamic token performs hash operation on its self-stored working key and a third usage code, takes a fifth hash data obtained as a third computing key.

Specifically, the dynamic token can combine its working key and the third usage code, which are stored in the dynamic token, to be a fifth data, fill the fifth data to obtain a fifth message, group the fifth message and performs iterative compression on obtained grouping data and obtains the fifth hash data.

In the present embodiment 1, the working key can be data with length of 32 bytes, the third usage cod can be data with length of 4 bytes, the fifth hash data obtained by performing hash operation on the working key and the third usage code can be data with length of 32 bytes.

For example, the third usage code of the dynamic token is "00000003", the working key is "a26d180368a3775b810eb54193804af 4c5edc74d3a1dddca28ba700091e99b03"; the fifth hash data obtained by performing hash on the working key and the third usage code is"AFCC4F6EA C971346E64D5F234505426558B84B61EAF8DFAA18E 8DD885BF11E3F".

Step 616, the dynamic token performs hash operation on the third computing key and a third time information to obtain a sixth hash data.

Specifically, the dynamic token can combine the third computing key and the third time information to be a sixth data, fill the sixth data to obtain a sixth message, group the sixth message and perform iterative compression on obtained grouping data and obtains the sixth hash data.

In the present embodiment 1, the third computing key can be data with length of 32 bytes, the third time information can be data with length of 8 bytes, the sixth hash data obtained by performing hash operation on the third computing key and the third time information can be data with length of 32 bytes.

For example, the third time information is "00000000015829CE", the third computing key is "AFCC4F6EAC971346E64D5F23450 5426558B84B61EAF8DFAA18E8DD885BF11E3F", the sixth hash data obtained by computing by the dynamic token is "e2738d9f6628bb77d6ef329e91c462c6a03ec54c190 87fd23779a70530bb4a80".

Step 617, the dynamic token performs bit interception on the sixth hash data to obtain a third bit interception result.

Specifically, the dynamic token can group the sixth hash data to obtain a plurality of byte groups, transform respective byte groups into corresponding binary data by shifting and combining the bytes contained in the byte groups; the dynamic token performs modulo operation on the first preset value by using sum of all the binary data obtained by transforming to obtain a modulo result, performs modulo operation on the second preset value by using the obtained modulo result and obtains the third bit interception result.

In the present embodiment 1, the sixth hash data is data with length of 32 bytes; the dynamic token can group the sixth hash data into 8 byte groups, each byte group contains 4 bytes, the 8 byte groups can be transformed into 8 binary data by shifting and combining the 4 bytes in respective byte groups. Further, the dynamic token obtains a result of adding all the 8 binary data, performs modulo operation on 232 by using the result to obtain a modulo result, performs modulo operation on 1000000 by using the obtained modulo result and obtains the third bit interception result.

For example, the sixth hash data obtained by computing by the dynamic token is "e2738d9f6628bb77d6ef329e91c462c6a03ec54c19087fd2 3779a70530bb4a80"; the third bit interception result is "590109".

Step 618, the dynamic token performs hash operation on the third computing key and a fourth time information to obtain a seventh hash data.

Specifically, the dynamic token can combine the third computing key and the fourth time information to be a seventh data, fill the seventh data to obtain a seventh message, group the seventh message and perform iterative compression on obtained grouping data and obtain the seventh hash data. In this case, the fourth time information is later than the third time information.

In the present embodiment 1, the third computing key can be data with length of 32 bytes, the fourth time information can be data with length of 8 bytes, the seventh hash data obtained by performing hash operation on the third computing key and the fourth time information can be data with length of 32 bytes.

For example, the third time information is "00000000015829CE", the third computing key is "AFCC4F6EAC971346E64D5F23450 5426558B84B61EAF8DFAA18E8DD885BF11E3F", the seventh hash data obtained by computing by the dynamic token is "ec3cf5692ca775c90d59dee26870ecd1af67faa0 588787608e838c93fe6179d5".

Step 619, the dynamic token performs bit interception on the seventh hash data to obtain a fourth bit interception result, displays the third bit interception result and the fourth bit interception result as a first synchronization code and a second synchronization code respectively, go back to Step 605.

Specifically, the dynamic token can group the seventh hash data to obtain a plurality of byte groups, transform respective byte groups into corresponding binary data by shifting and combining the bytes contained in the byte groups; the dynamic token performs modulo operation on the first preset value by using sum of all the binary data obtained by transforming to obtain a modulo result, performs modulo operation on the second preset value by using the obtained modulo result and obtains the fourth bit interception result.

In the present embodiment 1, the seventh hash data is data with length of 32 bytes; the dynamic token can group the seventh hash data into 8 byte groups, each byte group contains 4 bytes, the 8 byte groups can be transformed into 8 binary data by shifting and combining the 4 bytes in respective byte groups. Further, the dynamic token obtains a result of adding all the 8 binary data, performs modulo operation on 232 by using the result to obtain a modulo result, performs modulo operation on 1000000 by using the obtained modulo result and obtains the fourth bit interception result.

For example, the seventh hash data obtained by computing by the dynamic token is "ec3cf5692ca775c90d59dee26870ecd1af67faa058878760 8e838c93fe6179d5"; the fourth bit interception result is "836749", i.e. the first synchronization code is "590109", the second synchronization code is "836749".

It should be noted that, after Step 619, the client side can obtain the first synchronization code and the second synchronization code which are generated by the dynamic token, generate a synchronization request including the first synchronization code and the second synchronization code and the identity information, send the synchronization request to the authentication server.

Step 620, the dynamic token displays information indicating password error and updates times of startup failure.

Step 621, the dynamic token determines whether the times of startup failure is equal to a first preset times, if yes, go to Step 622; otherwise, go back to Step 603.

Step 622, the dynamic password displays information indicating that the token is locked, generates and displays an unlock request code, prompts the user to input a unlock code.

It should be noted that, after Step 622, the client side can obtain the unlock request code generated by the dynamic token, generate an unlock request including the unlock request code and identity information, send the unlock request to the authentication server.

Step 623, when the unlock code input by the user is obtained, the dynamic token performs hash operation on its working key and the third usage code which are stored in the dynamic token, takes the obtained fifth hash data as the third computing key.

Specifically, the dynamic token can combine its working key and the third usage code to be a fifth data, fill the fifth data to obtain a fifth message, group the fifth message and perform iterative compression on obtained grouping data and obtain the fifth hash data.

In the present embodiment 1, the working key can be data with length of 32 bytes, the third usage code can be data with length of 4 bytes, the fifth hash data obtained by performing hash operation on the working key and the third usage code can be data with length of 32 bytes.

For example, the third usage code in the dynamic token is "00000003"; the working key is "a26d180368a3775b810eb54193804af4 c5edc74d3a1dddca28ba700091e99b03"; the fifth hash data obtained by performing hash operation on the working key and the third usage code is "AFCC4F6EA C971346E64D5F234505426558B84B61EAF8DFAA18E 8DD885BF11E3F".

Step 624, the dynamic token performs hash on the third computing key and the unlock request code to obtain an eighth hash data.

Specifically, the dynamic token can combine the third computing key and the unlock request code to be an eighth data, fill the eighth data to obtain an eighth message, group the eighth message and perform iterative compression on obtained grouping data and obtains the eighth hash data.

In the present embodiment 1, the third computing key can be data with length of 32 bytes, the unlock request code can be data with length of 6 bytes, the fifth hash data obtained by performing hash operation on the third working key and the unlock request code can be data with length of 32 bytes.

For example, the unlock request code is "322337"; the third computing key is "AFCC4F6EAC971346E64D5F234505426558B84B 61EAF8DFAA18E8DD885BF11E3F"; the eighth hash data obtained by computing by the dynamic token is "76d4b125be1942f9e54dd6bcd0bde811673187a74b3210 84ce0df24c62809123".

Step 625, the dynamic token performs bit interception on the eighth hash data to obtain a fifth bit interception result.

Specifically, the dynamic token can group the eighth hash data to obtain a plurality of byte groups, transform respective byte groups into corresponding binary data by shifting and combining the bytes contained in the byte groups; the dynamic token performs modulo operation on the first preset value by using sum of all the binary data obtained by transforming to obtain a modulo result, performs modulo operation on the second preset value by using the obtained modulo result and obtains the fifth bit interception result.

In the present embodiment 1, the eighth hash data is data with length of 32 bytes; the dynamic token can group the eighth hash data into 8 byte groups, each byte group contains 4 bytes, the 8 byte groups can be transformed into 8 binary data by shifting and combining the 4 bytes in respective byte groups. Further, the dynamic token obtains a result of adding all the 8 binary data, performs modulo operation on 232 by using the result to obtain a modulo result, performs modulo operation on 1000000 by using the obtained modulo result and obtains the fifth bit interception result.

For example, the eighth hash data obtained by computing by the dynamic token is "76d4b125be1942f9e54dd6bcd0bde811673187a74b32108 4ce0df24c62809123"; the fifth bit interception is "783109".

Step 626, the dynamic token determines whether the fifth bit interception result is identical to the obtained unlock code, if yes, execute Step 627; otherwise, execute Step 629.

Step 627, the dynamic token displays information indicating successful unlocking and initializes the times of unlock failure.

Step 628, the dynamic token resets the startup password, stores the reset startup password and initializes the times of startup failure, then go back to Step 605.

Step 629, the dynamic token displays information indicating unlock failure and updates the times of unlock failure.

Step 630, the dynamic password determines whether the times of unlock failure is equal to a second preset times, if yes, execute Step 631; otherwise, go back to Step 622.

Step 631, the dynamic token clears its self-stored original seed key and the working key and displays information that the dynamic token is self-destroying.

Figure 6:
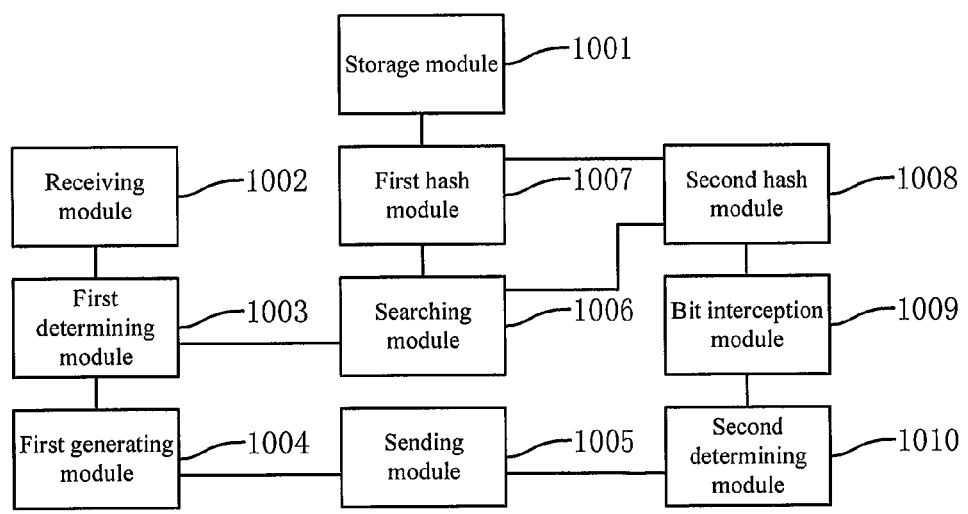
FIG. 6 is a structural diagram of an authentication server in Embodiment 2 of the present invention.

It should be noted that the dynamic token of the embodiment of the present invention is required to be activated before working normally, i.e. executing flow of the working method shown by FIG. 6 and FIG. 7. The process of activating the dynamic token in the embodiment of the present invention includes that the dynamic token obtains a activation code input by the user, performs hash operation on the activation code and its self-stored original seed key, stores a ninth hash data obtained as the working key; the dynamic token sets up a startup password, stores the set startup password and initializes the times of startup failure.

Specifically, the dynamic token can combine the activation code and its self-stored original seed key to be an ninth data, fill the ninth data to obtain a ninth message, group the ninth message and performs iterative compression on the grouped data so as to obtain the ninth hash data.

In the present embodiment 1, the activation code can be data with length of 12 bytes, the original seed key can be data with length of 32 bytes, the ninth hash data obtained by performing hash operation on the activation code and its self-stored original seed key can be data with length of 32 bytes.

For example, the activation code is "123456792518", the original seed key is "00010203040 5060708090A0B0C0D0E0F101112131415161718191A1 B1C1D1E1F"; correspondingly, the ninth hash data obtained by computing by the dynamic token is "a26d180368a3775b810eb54193804af4c5edc74d3a1dd dca28ba700091e99b03".

Figure 3:
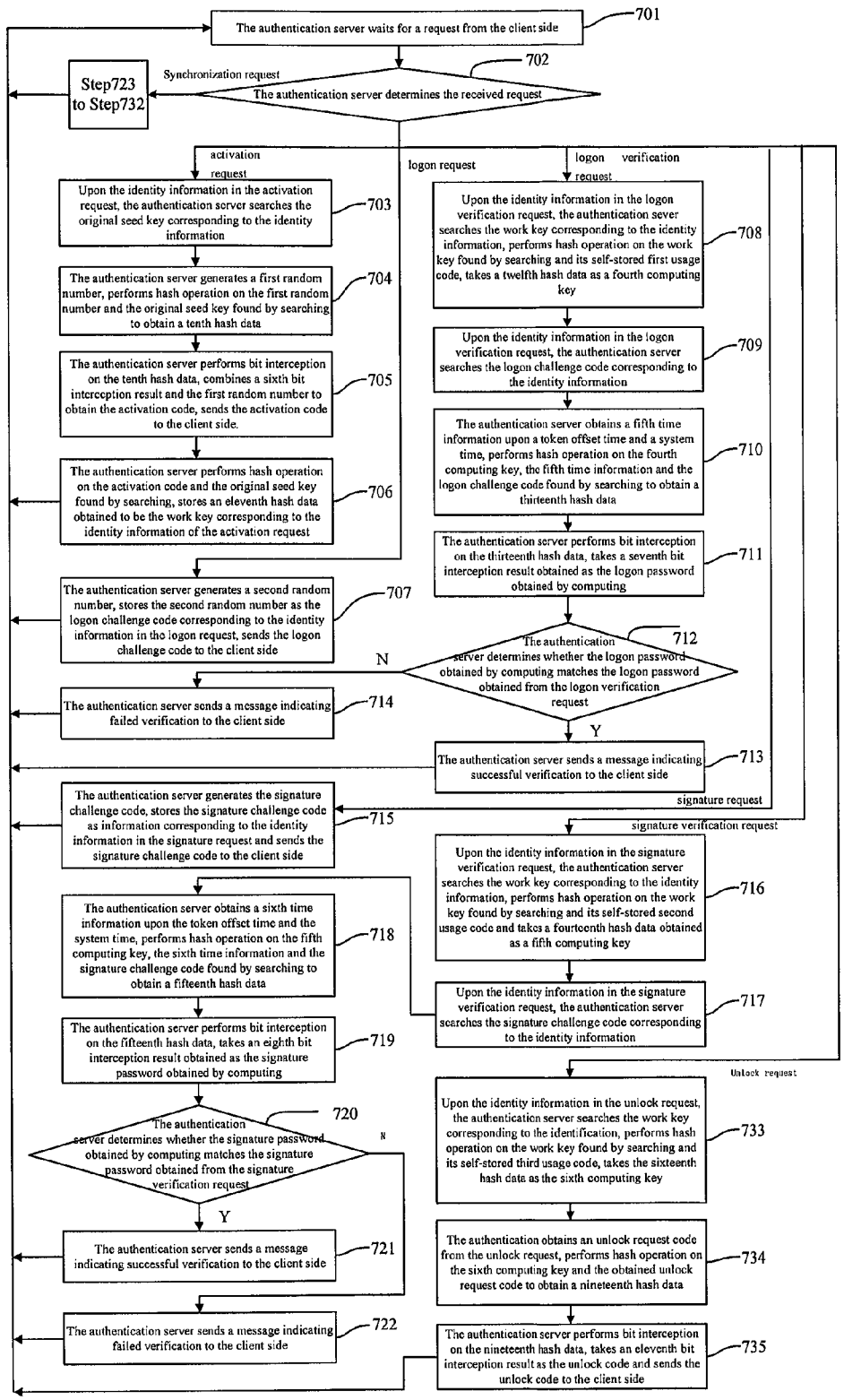
FIG. 3 and FIG. 4 present a flow chart of a working method for an authentication server illustrated in Embodiment 1 of the present invention.
Figure 4:
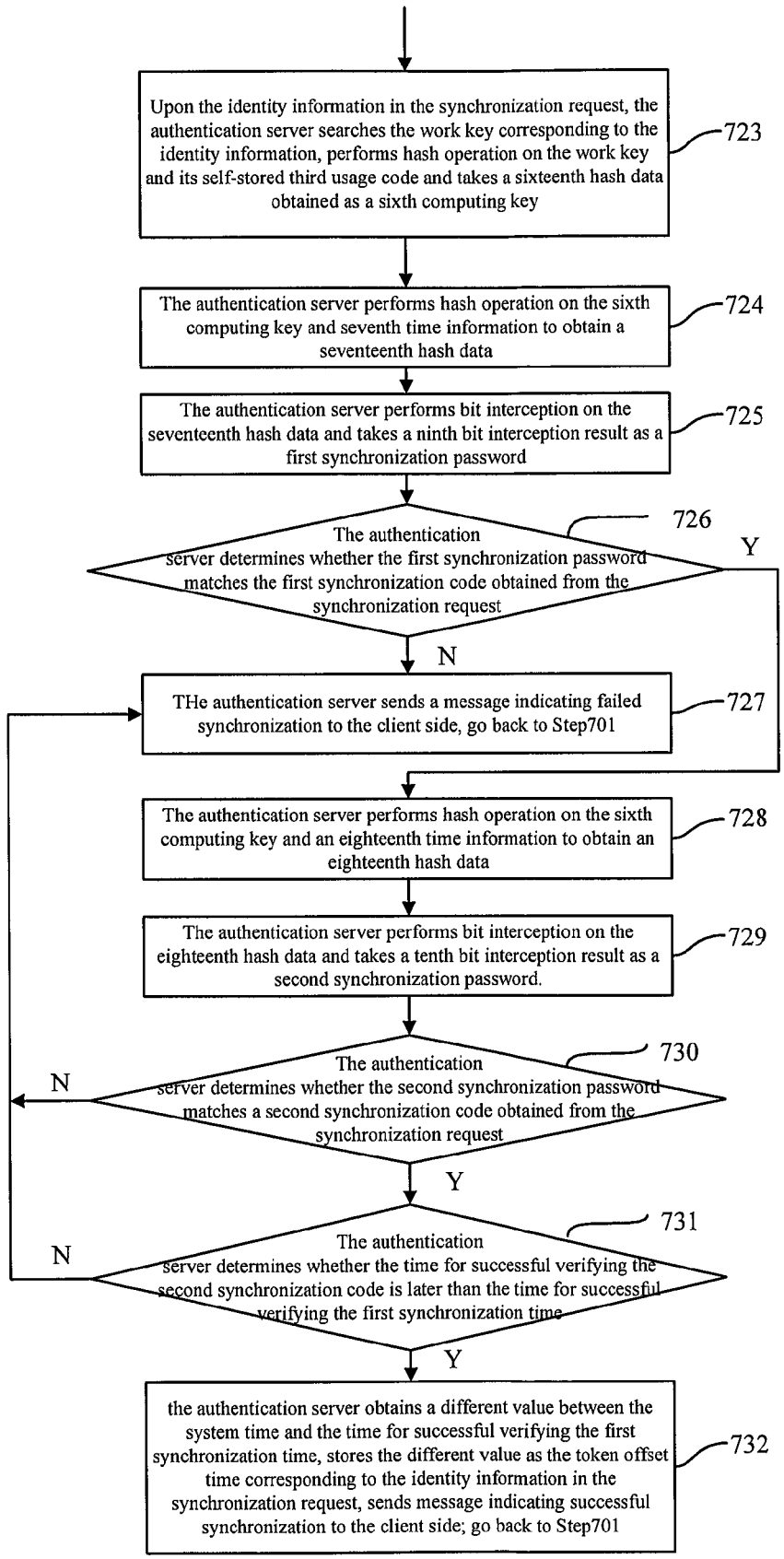

In this case, the activation code used in the activation process by the dynamic token is generated by the authentication sever; as shown by FIG. 3 and FIG. 4, the working method of the authentication server includes following steps:

Step 701, the authentication server waits for a request from the client side.

Step 702, after receiving the request from the client side, the authentication server determines the received request, if the request is a activation request, execute Step 703;

if the request is a logon request, execute Step 707;

if the request is a logon verification request, execute Step 708;

if the request is a signature request, execute Step 715;

if the request is a signature verification request, execute Step 716;

if the request is a synchronization request, execute Step 723; and if the request is an unlock request, execute Step 733.

Step 703, upon the identity information in the activation request, the authentication server searches the original seed key corresponding to the identity information, in which the identity information can be a username, a serial number of the token, or any other information for marking identity of a user of a dynamic token.

Step 704, the authentication server generates a first random number, performs hash operation on the first random number and the original seed key found by searching to obtain a tenth hash data.

Specifically, the authentication server can combine the first random number and the original seed key found by searching to be a tenth data, fill the tenth data to obtain a tenth message, group the tenth message and performs iterative compression on obtained grouping data and obtain the tenth hash data.

In the present embodiment 1, the first random number can be data with length of 6 bytes; the original seed key found by searching can be data with length of 32 bytes; correspondingly, the tenth hash data obtained by performing hash operation on the first random number and the original seed key can be data with length of 32 bytes.

For example, the first random number is "123456"; the original seed key is "000102030405060708090A0B0C0D0E0F1011121314 15161718191A1B1C1D1E1F"; the tenth hash data obtained by computing by the authentication server is "f12cf8c66ed35ca267886d737e1bc9ba846a4d1b316008d 561b951ad4662bf54".

Step 705, the authentication server performs bit interception on the tenth hash data, combines a sixth bit interception result and the first random number to obtain the activation code, sends the activation code to the client side.

Specifically, the authentication server can group the tenth hash data to obtain a plurality of byte groups, transform respective byte groups into corresponding binary data by shifting and combining the bytes contained in the byte groups; the authentication server performs modulo operation on the first preset value by using sum of all the binary data obtained by transforming to obtain a modulo result, performs modulo operation on the second preset value by using the obtained modulo result and obtains the sixth bit interception result.

In the present embodiment 1, the tenth hash data is data with length of 32 bytes; the authentication server can group the eighth hash data into 8 byte groups, each byte group contains 4 bytes, the 8 byte groups can be transformed into 8 binary data by shifting and combining the 4 bytes in respective byte groups. Further, the authentication sever obtains a result of adding all the 8 binary data, performs modulo operation on 232 by using the result to obtain a modulo result, performs modulo operation on 1000000 by using the obtained modulo result and obtains the sixth bit interception result.

For example, the tenth hash data obtained by computing by the authentication server is "f12cf8c66ed35ca267886d737e1bc9ba846a4d1b316008 d561b951ad4662bf54"; the sixth bit interception result is "792518"; the authentication server combines the sixth bit interception result "792518" and the first random number "123456" to obtain the activation code "123456792518".

It should be noted that after Step 705, the client side can display the received activation code to the client.

Step 706, the authentication server performs hash operation on the activation code and the original seed key found by searching, stores an eleventh hash data obtained to be the working key corresponding to the identity information of the activation request; go back to Step 701.

Specifically, the authentication server can combine the activation code and the original seed key found by searching to be an eleventh data, fill the eleventh data to obtain an eleventh message, group the eleventh message and perform iterative compression on obtained grouping data and obtain the eleventh hash data.

In the present embodiment 1, the activation code can be data with length of 12 bytes, the original seed key found by searching can be data with length of 32 bytes; the eleventh hash data obtained by performing hash operation on the activation code and the original seed key found by searching can be data with length of 32 bytes.

Step 707, the authentication server generates a second random number, stores the second random number as the logon challenge code corresponding to the identity information in the logon request, sends the logon challenge code to the client side; go back to Step 701.

In this case, the second random number can be data with length of 6 bytes, for example, "012345".

It should be noted that, after Step 707, the client side displays the received logon challenge cod to the user.

Step 708, upon the identity information in the logon verification request, the authentication sever searches the working key corresponding to the identity information, performs hash operation on the working key found by searching and its self-stored first usage code, takes a twelfth hash data as a fourth computing key.

Specifically, the authentication server can combine the working key found by searching and the first usage code to be a twelfth data, fill the twelfth data to obtain a twelfth message, group the twelfth message and perform iterative compression on obtained grouping data and obtain the twelfth hash data.

In the present embodiment 1, the working key found by searching by the authentication server can be data with length of 32 bytes; the first usage code can be data of 4 bytes; the twelfth hash data obtained by performing hash operation on the working key found by searching and the first usage code can be data with length of 32 bytes.

Step 709, upon the identity information in the logon verification request, the authentication server searches the logon challenge code corresponding to the identity information.

Step 710, the authentication server obtains a fifth time information upon a token offset time and a system time, performs hash operation on the fourth computing key, the fifth time information and the logon challenge code found by searching to obtain a thirteenth hash data.

Specifically, the authentication server can combine the fourth computing key, the fifth time information and the logon challenge code found by searching to be a thirteenth data, fill the thirteenth data to obtain a thirteenth message, group the thirteenth message and performs iterative compression on obtained grouping data and obtain the thirteenth hash data.

In the present embodiment 1, the fourth computing key can be data with length of 32 bytes; the fifth time information can be data with length of 8 bytes; the logon challenge code found by searching can be data with length of 6 bytes; the thirteenth hash data obtained by performing hash operation on the fourth computing key, the fifth time information and the logon challenge code found by searching can be data with length of 32 bytes.

Step 711, the authentication server performs bit interception on the thirteenth hash data, takes a seventh bit interception result obtained as the logon password obtained by computing.

Specifically, the authentication server can group the thirteenth hash data to obtain a plurality of byte groups, transform respective byte groups into corresponding binary data by shifting and combine the bytes contained in the byte groups; the authentication server performs modulo operation on the first preset value by using sum of all the binary data obtained by transforming to obtain a modulo result, performs modulo operation on the second preset value by using the obtained modulo result and obtains the seventh bit interception result.

In the present embodiment 1, the thirteenth hash data is data with length of 32 bytes; the authentication server can group the thirteenth hash data into 8 byte groups, each byte group contains 4 bytes, the 8 byte groups can be transformed into 8 binary data by shifting and combining the 4 bytes in respective byte groups. Further, the authentication sever obtains a result of adding all the 8 binary data, performs modulo operation on 232 by using the result to obtain a modulo result, performs modulo operation on 1000000 by using the obtained modulo result and obtains the seventh bit interception result.

Step 712, the authentication server determines whether the logon password obtained by computing matches the logon password obtained from the logon verification request, if yes, execute Step 713; otherwise, execute Step 714.

Specifically, the logon password obtained by computing by the authentication server can be one password; correspondingly, the authentication server can determine whether the logon password obtained by computing is identical to the logon password obtained from the logon request, if yes, the logon password obtained by computing matches the logon password obtained from the logon verification request; otherwise, the logon password obtained by computing does not match the logon password obtained from the logon verification request.

The logon password obtained by computing by the authentication server can include a plurality of passwords; correspondingly, the authentication server can determine whether the logon password obtained by computing includes the logon password obtained from the logon request; if yes, the logon password obtained by computing matches the logon password obtained from the logon verification request; otherwise, the logon password obtained by computing does not match the logon password obtained from the logon verification request.

Step 713, the authentication server sends a message indicating successful verification to the client side, go back to Step 701.

Step 714, the authentication server send a message indicating failed verification to the client side, go back to Step 701.

Step 715, the authentication server generates the signature challenge code, stores the signature challenge code as information corresponding to the identity information in the signature request and sends the signature challenge code to the client side; go back to Step 701.

Specifically, the authentication server can store part or all of business data as the signature challenge code corresponding to the identity information in the signature request; the authentication can generate a third random number, combine the third random number and part or all of the business data, store data obtained by combining as the signature challenge code corresponding to the identity information in the signature request; in this case, the signature challenge code can be data with length of 6 bytes, for example, "012345".

It should be noted that, after Step 715, the client side can display the received signature challenge code to the user.

Step 716, upon the identity information in the signature verification request, the authentication server searches the working key corresponding to the identity information, performs hash operation on the working key found by searching and its self-stored second usage code and takes a fourteenth hash data obtained as a fifth computing key.

Specifically, the authentication server can combine the working key found by searching and the second usage code to be the a fourteenth data, fill the fourteenth data to obtain a fourteenth message, group the fourteenth message and perform iterative compression on obtained grouping data and obtain the fourteenth hash data.

In the present embodiment 1, the working key found by searching by the authentication server can be data with length of 32 bytes, the second usage code can be data with length of 4 bytes, the fourteenth hash data obtained by performing hash operation on the working key found by searching and the second usage code can be data with length of 32 bytes.

Step 717, upon the identity information in the signature verification request, the authentication server searches the signature challenge code corresponding to the identity information.

Step 718, the authentication server obtains a sixth time information upon the token offset time and the system time, performs hash operation on the fifth computing key, the sixth time information and the signature challenge code found by searching to obtain a fifteenth hash data.

Specifically, the authentication server can combine the fifth computing key, the sixth time information and the signature challenge code found by searching to be a fifth data, fill the fifth data to obtain a fifteenth message, group the fifteenth message and perform iterative compression on obtained grouping data and obtain the fifteenth hash data.

In the present embodiment 1, the fifth computing key can be data with length of 32 bytes; the sixth time information can be data with length of 8 bytes; the signature challenge code found by searching can be data with length of 6 bytes; the fifteenth hash data obtained by performing hash operation on the fifth computing key, the sixth time information and the signature challenge code found by searching can be data with length of 32 bytes.

Step 719, the authentication server performs bit interception on the fifteenth hash data, takes an eighth bit interception result obtained as the signature password obtained by computing.

Specifically, the authentication server can group the fifteenth hash data to obtain a plurality of byte groups, transform respective byte groups into corresponding binary data by shifting and combining the bytes contained in the byte groups; the authentication server performs modulo operation on the first preset value by using sum of all the binary data obtained by transforming to obtain a modulo result, performs modulo operation on the second preset value by using the obtained modulo result and obtains the eighth bit interception result.

In the present embodiment 1, the fifteenth hash data is data with length of 32 bytes; the authentication server can group the fifteenth hash data into 8 byte groups, each byte group contains 4 bytes, the 8 byte groups can be transformed into 8 binary data by shifting and combining the 4 bytes in respective byte groups. Further, the authentication sever obtains a result of adding all the 8 binary data, performs modulo operation on 232 by using the result to obtain a modulo result, performs modulo operation on 1000000 by using the obtained modulo result and obtains the eighth bit interception result.

Step 720, the authentication server determines whether the signature password obtained by computing matches the signature password obtained from the signature verification request; if yes, execute Step 721; otherwise, execute Step 722.

Specifically, the signature password obtained by computing by the authentication server can be one password; correspondingly, the authentication server can determine whether the signature password obtained by computing is identical to the signature password obtained from the signature verification request, if yes, the signature password obtained by computing matches the signature password obtained from the signature verification request; otherwise, the signature password obtained by computing does not match the signature password obtained from the logon verification request.

The signature password obtained by computing by the authentication server can include a plurality of passwords; correspondingly, the authentication server can determine whether the logon password obtained by computing includes the logon password obtained from the logon request; if yes, the logon password obtained by computing matches the logon password obtained from the logon verification request; otherwise, the logon password obtained by computing does not match the logon password obtained from the logon verification request.

Step 721, the authentication server sends a message indicating successful verification to the client side, go back to Step 701.

It should be noted that, after Step 721, the client side can display the received message indicating successful verification to the user.

Step 722, the authentication server sends a message indicating failed verification to the client side, go back to Step 701.

It should be noted that, after Step 722, the client side can display the received message indicating failed verification to the user.

Step 723, upon the identity information in the synchronization request, the authentication server searches the working key corresponding to the identity information, performs hash operation on the working key and its self-stored third usage code and takes a sixteenth hash data obtained as a sixth computing key.

Specifically, the authentication server can combine the working key found by searching and the third usage code to be a sixteenth data, fill the sixteenth data to obtain a sixteenth message, group the sixteenth message and perform iterative compression on obtained grouping data and obtain the sixteenth hash data.

In the present embodiment 1, the working key found by searching by the authentication server can be data with length of 32 bytes, the third usage code can be data with length of 4 bytes; the sixteenth hash data obtained by performing hash operation on the working key found by searching and the third usage code to be data with length of 32 bytes.

Step 724, the authentication server performs hash operation on the sixth computing key and seventh time information to obtain a seventeenth hash data.

Specifically, the authentication server can combine sixth computing key and seventh time information to be a seventeenth data, fill the seventeenth data to obtain a seventeenth message, group the seventeenth message and perform iterative compression on obtained grouping data and obtain the seventeenth hash data.

In the present embodiment 1, the sixth computing key can be data with length of 32 bytes; the seventh time information can be data with length of 8 bytes; the seventeenth hash data obtained by performing hash operation on the sixth computing key and the seventh time information can be data with length of 32 bytes.

Step 725, the authentication server performs bit interception on the seventeenth hash data and takes a ninth bit interception result as a first synchronization password.

Specifically, the authentication server can group the seventeenth hash data to obtain a plurality of byte groups, transform respective byte groups into corresponding binary data by shifting and combining the bytes contained in the byte groups; the authentication server performs modulo operation on the first preset value by using sum of all the binary data obtained by transforming to obtain a modulo result, performs modulo operation on the second preset value by using the obtained modulo result and obtains the ninth bit interception result.

In the present embodiment 1, the seventeenth hash data is data with length of 32 bytes; the authentication server can group the seventeenth hash data into 8 byte groups, each byte group contains 4 bytes, the 8 byte groups can be transformed into 8 binary data by shifting and combining the 4 bytes in respective byte groups. Further, the authentication sever obtains a result of adding all the 8 binary data, performs modulo operation on 232 by using the result to obtain a modulo result, performs modulo operation on 1000000 by using the obtained modulo result and obtains the ninth bit interception result.

Step 726, the authentication server determines whether the first synchronization password matches the first synchronization code obtained from the synchronization request; if yes, execute Step 728; otherwise, execute Step 727.

Specifically, the first synchronization password can be one password; correspondingly, the authentication server can determine whether the first synchronization password is identical to the first synchronization code obtained from the synchronization request, if yes, the first synchronization password matches the first synchronization code obtained from the synchronization request; otherwise, the first synchronization password does not match the first synchronization code obtained from the synchronization request.

The first synchronization password can include a plurality of passwords; correspondingly, the authentication server can determine whether the first synchronization password includes the first synchronization code obtained from the synchronization request, if yes, the first synchronization password matches the first synchronization code obtained from the synchronization request; otherwise, the first synchronization password does not match the first synchronization code obtained from the synchronization request.

Step 727, the authentication server sends a message indicating failed synchronization to the client side, go back to Step 701;

It should be noted that, after Step 727, the client side can display the received message indicating failed synchronization to the user.

Step 728, the authentication server performs hash operation on the sixth computing key and an eighteenth time information to obtain an eighteenth hash data.

Specifically, the authentication server can combine sixth computing key and eighth time information to be a eighteenth data, fill the seventeenth data to obtain a seventeenth message, group the seventeenth message and perform iterative compression on obtained grouping data and obtain the seventeenth hash data.

In the present embodiment 1, the sixth computing key can be data with length of 32 bytes, the eighth time information can be data with length of 8 bytes; the eighteenth hash data obtained by perform hash operation on the sixth computing key and the eighth time information can be data with length of 32 bytes.

Step 729, the authentication server performs bit interception on the eighteenth hash data and takes a tenth bit interception result as a second synchronization password.

Specifically, the authentication server can group the eighteenth hash data to obtain a plurality of byte groups, transform respective byte groups into corresponding binary data by shifting and combining the bytes contained in the byte groups; the authentication server performs modulo operation on the first preset value by using sum of all the binary data obtained by transforming to obtain a modulo result, performs modulo operation on the second preset value by using the obtained modulo result and obtains the tenth bit interception result.

In the present embodiment 1, the eighteenth hash data is data with length of 32 bytes; the authentication server can group the eighteenth hash data into 8 byte groups, each byte group contains 4 bytes, the 8 byte groups can be transformed into 8 binary data by shifting and combining the 4 bytes in respective byte groups. Further, the authentication sever obtains a result of adding all the 8 binary data, performs modulo operation on 232 by using the result to obtain a modulo result, performs modulo operation on 1000000 by using the obtained modulo result so as to obtain the tenth bit interception result.

Step 730, the authentication server determines whether the second synchronization password matches a second synchronization code obtained from the synchronization request, if yes, execute Step 731; otherwise, execute Step 727.

Specifically, the second synchronization password can be one password; correspondingly, the authentication server can determine whether the second synchronization password is identical to the second synchronization code obtained from the synchronization request, if yes, the second synchronization password matches the second synchronization code obtained from the synchronization request; otherwise, the second synchronization password does not match the second synchronization code obtained from the synchronization request.

The second synchronization password can include a plurality of passwords; correspondingly, the authentication server can determine whether the second synchronization password includes the second synchronization code obtained from the synchronization request, if yes, the second synchronization password matches the second synchronization code obtained from the synchronization request; otherwise, the second synchronization password does not match the second synchronization code obtained from the synchronization request.

Step 731, the authentication server determines whether the time for successful verifying the second synchronization code is later than the time for successful verifying the first synchronization time, if yes, execute Step 732; otherwise, go back to Step 727.

Step 732, the authentication server obtains a different value between the system time and the time for successful verifying the first synchronization time, stores the different value as the token offset time corresponding to the identity information in the synchronization request, sends message indicating successful synchronization to the client side; go back to Step 701.

It should be noted that, after Step 732, the client side can display the received message indicating successful synchronization to the client.

Step 733, upon the identity information in the unlock request, the authentication server searches the working key corresponding to the identification, performs hash operation on the working key found by searching and its self-stored third usage code, takes the sixteenth hash data as the sixth computing key.

Specifically, the authentication server can combine the working key found by searching and the third usage code to be the sixteenth data, fill the sixteenth data to obtain the sixteenth message, group the sixteenth message and perform iterative compression on obtained grouping data and obtain the sixteenth hash data.

In the present embodiment 1, the working key found by searching by the authentication server can be data with length of 32 bytes, the third usage code can be data with length of 4 bytes; the sixteenth hash data obtained by performing hash operation on the working key found by searching and the third usage code to be data with length of 32 bytes.

Step 734, the authentication obtains an unlock request code from the unlock request, performs hash operation on the sixth computing key and the obtained unlock request code to obtain a nineteenth hash data.

Specifically, the authentication server can combine the sixth computing key and the obtained unlock request code to be a nineteenth data, fill the nineteenth data to obtain a nineteenth message, group the nineteenth message and perform iterative compression on obtained grouping data and obtain the nineteenth hash data.

In the present embodiment 1, the unlock request code obtained by the authentication server can be data with length of 6 bytes; the sixth computing key can be data with length of 32 bytes; the nineteenth hash data obtained by performing hash operation on the sixth computing key and the obtained unlock request code can be data with length of 32 bytes.

Step 735, the authentication server performs bit interception on the nineteenth hash data, takes an eleventh bit interception result as the unlock code and sends the unlock code to the client side; go back to Step 701.

Specifically, the authentication server can group the nineteenth hash data to obtain a plurality of byte groups, transform respective byte groups into corresponding binary data by shifting and combining the bytes contained in the byte groups; the authentication server performs modulo operation on the first preset value by using sum of all the binary data obtained by transforming to obtain a modulo result, performs modulo operation on the second preset value by using the obtained modulo result so as to obtain the eleventh bit interception result.

In the present embodiment 1, the nineteenth hash data is data with length of 32 bytes; the authentication server can group the eighteenth hash data into 8 byte groups, each byte group contains 4 bytes, the 8 byte groups can be transformed into 8 binary data by shifting and combining the 4 bytes in respective byte groups. Further, the authentication sever obtains a result of adding all the 8 binary data, performs modulo operation on 232 by using the result to obtain a modulo result, performs modulo operation on 1000000 by using the obtained modulo result so as to obtain the eleventh bit interception result.

It should be noted that, after Step 735, the client side can display the received unlock code to the user.

In the present embodiment 1 of the present invention, the authentication server obtains corresponding computing key upon different usage codes and uses the obtained computing key to verify the dynamic passwords of variety of application sites, which reduces the risks that the key is stolen and improves the security of the token authentication system.

Embodiment 2

Embodiment 2 of the present invention provides structure of the dynamic token and the authentication server described in Embodiment 1.

Figure 5:
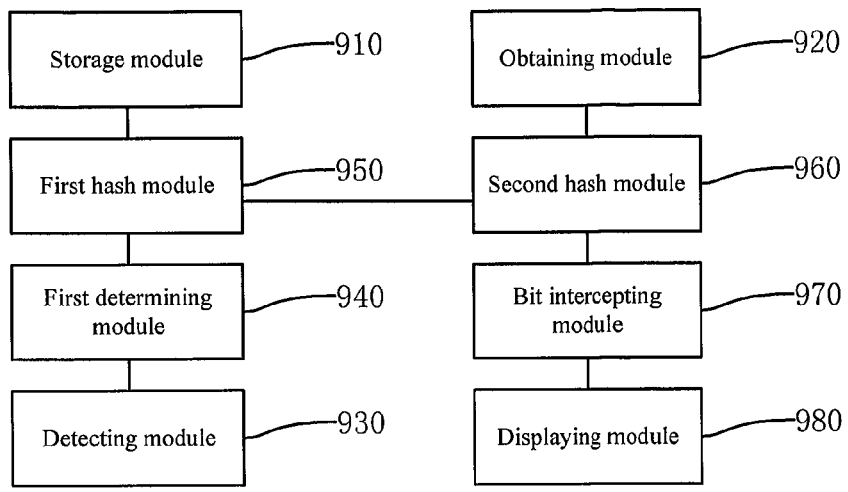
FIG. 5 is a structural diagram of a dynamic token in Embodiment 2 of the present invention.

FIG. 5 presents a structural diagram of the dynamic token of Embodiment 2, which comprises:

a storing module 910 configured to store the working key, the first usage code and the second usage code;

an obtaining module 920 configured to obtain the logon challenge code and the signature challenge code input by the user;

a detecting module 930 configured to detecting a press key;

a first determining module 940 configured to, when the detecting module 930 detected that a press key is triggered, determine the press key which is triggered;

a first hash module 950 configured to perform hash operation on the working key and the first usage code stored by the storing module 910 to obtain a first hash data when the first determining module 940 determines that the press key triggered is the first press key; perform hash operation on the working key and the second usage code stored by the storing module 910 to obtain a third hash data when the first determining module 940 determines that the press key being trigged is the second key;

a second hash module 960 configured to take the first hash data, which is obtained by the hash operation performed by the first hash module 950, as the first computing key, perform hash operation on the first computing key, the first time information and the logon challenge code obtained by the obtaining module 920 to obtain the second hash data; take the third hash data obtained by the first hash module 950 as the second computing key, perform the second computing key, the second time information and the signature challenge code obtained by the obtaining module 920 to obtain the fourth hash data;

a bit intercepting module 970 configured to perform bit interception on the second hash data, which is obtained by the hash operation performed by the second hash module 960, to obtain the first bit interception result; perform bit interception on the fourth hash data obtained by the second hash module 960 to obtain the second bit interception result; and a displaying module 980 configured to take the first bit interception result, which is obtained by bit interception performed by the bit intercepting module, as the logon password to display; take the second interception result, which is obtained by bit interception performed by the bit interception module, as the signature password to display.

Specifically, the first hash module 950 specifically configured to combine the working key and the first usage code to be a first data, fill the first data to obtain a first message, group the first message and performs iterative compression on obtained grouping data and obtain the first hash data; combine the working key and the second usage code to be a third data, fill the third data to obtain a third message, group the third message and perform iterative compression on obtained grouping data and obtain the third hash data;

the second hash module 960 configured to combine the first computing key, the first time information and the logon challenge code to be a second data, fill the second data to obtain a first message, group the second message and performs iterative compression on obtained grouping data and obtain the second hash data; combine the second computing key, the second time information and the signature challenge code to be a fourth data, fill the fourth data to obtain a fourth message, group the fourth message, perform iterative compression on obtained grouping data and obtain the fourth hash data.

the bit interception module 970 configured to group the second hash data, obtain a plurality of byte groups, transform respective byte groups into corresponding binary data by shifting and combining the bytes contained in the byte groups; perform modulo operation on a first preset value by using sum of all the binary data obtained by transforming to obtain a modulo result, perform modulo operation on a second preset value by using the obtained modulo result and obtain the first bit interception result; group the fourth hash data to obtain a plurality of byte groups, transform respective byte groups into corresponding binary data by shifting and combining the bytes contained in the byte groups; perform modulo operation on a first preset value by using sum of all the binary data obtained by transforming to obtain a modulo result, perform modulo operation on a second preset value by using the obtained modulo result and obtain the second bit interception result.

Further, the storing module 910 is configured to store the third usage code;

the first hash module 950 is further configured to perform hash operation on the working key and the third usage code, which are stored by the storing module 910, to obtain the fifth hash data when the first determining module 940 determines that the press key triggered is the third press key;

the second hash module 960 is further configured to take the fifth hash data, which is obtained by hash operation performed by the first hash module 950, as the third computing key, perform the third computing key and the third time information to obtain the sixth hash data; perform hash operation on the third computing key and the fourth time information to obtain the seventh hash data;

the bit interception module 970 is further configured to perform bit interception on the sixth hash data to obtain the third interception result; perform bit interception on the seventh hash data to obtain the fourth bit interception result;

the displaying module 980 is further configured to take the third bit interception result and the fourth bit interception result as the first synchronization code and the second synchronization code to display.

Specifically, the first hash module 950 is specifically configured to combine the working key and the third usage code into the fifth data, fill the fifth data to obtain the fifth message, group the fifth message and perform iterative compression on obtained grouping data and obtain the fifth hash data;

the second hash module 960 is configured to combine the third computing key and the third time information into the sixth data, fill the sixth data to obtain the sixth message, group the sixth message and perform iterative compression on obtained grouping data and obtain the sixth hash data; combine the third computing key and the fourth time information into the seventh data, fill the seventh data to obtain the seventh message, group the seventh message and perform iterative compression on obtained grouping data and obtain the seventh hash data.

The bit interception module 970 specifically is configured to group the sixth hash data, obtain a plurality of byte groups, transform respective byte groups into corresponding binary data by shifting and combining the bytes contained in the byte groups; perform modulo operation on the first preset value by using sum of all the binary data obtained by transforming to obtain a modulo result, perform modulo operation on the second preset value by using the obtained modulo result and obtain the third bit interception result; group the seventh hash data to obtain a plurality of byte groups, transform respective byte groups into corresponding binary data by shifting and combining the bytes contained in the byte groups; perform modulo operation on the first preset value by using sum of all the binary data obtained by transforming to obtain a modulo result, perform modulo operation on the second preset value by using the obtained modulo result so as to obtain the fourth bit interception result.

Further, the storing module 910 is configured to store the original seed key and the third usage code; and the obtaining module 920 is configured to obtain an activation code input by the user.

The dynamic token further comprises:

a third hash module configured to perform hash operation on the activation code and the original seed key, store the ninth hash data as the working key; and a setting module configured to set the startup password after the third hash module stores the working key, store the startup password in the storing module 910.

Specifically, the third hash module specifically is configured to combine the activation code and the original see key to be the ninth data, fill the ninth data to obtain the ninth message, group the ninth message and perform iterative compression on obtained grouping data and obtain the ninth hash data.

Further, the displaying module 980 is configured to prompt the user to input the startup password; and the obtaining module 920 is configured to obtain the startup password input by the user.

Correspondingly, the dynamic token further includes:

a second determining module configured to determine whether the startup password obtained by the obtaining module 920 is identical to the startup password stored by the storing module 910;

a first initializing module configured to initialize times of startup failure when the second determining module determines that the startup password obtained by the obtaining module 920 is identical to the startup password stored by the storing module 910;

a first updating module configured to update the times of startup failure when second determining module determines that the startup password obtained by the obtaining module 920 is not identical to the startup password stored by the storing module 910;

a third determining module configured to determine whether the times of startup failure updated by the first updating module is equal to a first preset times; and a generating module configured to generate an unlock request code when the third determining module determines that the times of startup failure is equal to the first preset times.

The displaying module 980 is further configured to display the unlock request code generated by the generating module and prompt the user to input an unlock code;

the obtaining module 920 is further configured to obtain the unlock code input by the user;

the first hash module 950 is further configured to perform hash operation on the working key stored by the storing module 910 and the third usage code to obtain the fifth hash data;

the second hash module 960 is further configured to take the fifth hash data as the third computing key, perform hash operation on the third computing key and the unlock request code to obtain the eighth hash data;

the bit interception module 970 is further configured to perform bit interception on the eighth hash data to obtain the fifth bit interception result;

the fourth determining module is configured to determine whether the fifth bit interception result is identical to the unlock code;

the displaying module 980 is further configured to display information of successful unlock when the fourth module determines that the fifth bit interception result is identical to the unlock code; display information of failed unlock when the fourth determining module determines that the fifth bit interception result is not identical to the unlock code; and the setting module is configured to reset the startup password and store the reset startup password when the fourth determining module determines that the fifth bit interception result is identical to the unlock code.

Further, the dynamic token further comprises:

a second initializing module configured to initialize the times of failed unlock when the fourth determining module determines that the fifth bit interception result is identical to the unlock code;

a second updating module configured to update the time of failed unlock when the fourth determining module determines that the fifth bit interception result is not identical to the unlock code;

a fifth determining module configured to determine whether the times of failed unlock equals a second preset times, trigger the generating module to generate the unlock request code when the fifth determining module determines that the times of failed unlock is not equal to the second preset times; and a clearing module configured to clear the original seed key and the working key stored in the storing module 910 when the fifth determining module determines that the times of failed unlock is equal to the second preset times;

in which the displaying module 980 is further configured to display information that the token is self-destroyed when the fifth determining module determines that the times of failed unlock equals the second preset times.

Further, the dynamic token further comprises:

a sixth determining module configured to determine whether the dynamic token is locked when the dynamic token is powered up; trigger the generating module to generate the unlock request code when the sixth determining module determines that the dynamic token is locked; trigger the displaying module 980 to prompt the user to input the startup password when the sixth determining module determines that the dynamic token is not locked.

Specifically, the first hash module 950 is configured to combine the working key and the third usage code into the fifth data, fill the fifth data to obtain the fifth message, group the fifth message and perform iterative compression on obtained grouping data so as to obtain the fifth hash data.

the second hash module 960 is specifically configured to combine the third computing key and the unlock request code to be the eighth data, fills the eighth data to obtain the eighth message, group the eighth message and perform iterative compression on obtained grouping data and obtain the eighth hash data.

The bite interception module 970 is specifically configured to group the eighth hash data to obtain a plurality of byte groups, transform respective byte groups into corresponding binary data by shifting and combining the bytes contained in the byte groups; perform modulo operation on the first preset value by using sum of all the binary data obtained by transforming to obtain a modulo result, perform modulo operation on the second preset value by using the obtained modulo result and obtain the fifth bit interception result;

In the embodiment 2 of the present invention, the dynamic token generates different computing keys (calculation keys) upon different usage code, dynamic passwords used in variety of application sites (application scenario) is generated upon different usage codes, which reduces risks that the key used for generating a dynamic password is being stolen and improves security of a token verification system.

FIG. 6 shows structural diagram of authentication server of Embodiment 2 of the present invention, which comprises:

a storing module 1001 configured to store the first usage code and the second usage code;

a receiving module 1002 configured to receive a request of the client side;

a first determining module 1003 configured to determine the request received from the receive module 1002;

a first generating module 1004 configured to generate a logon challenge code and store the logon challenge code as information corresponding to the identity information when the first determining module 1003 determines that the received request is logon request; generate a signature challenge code and store the signature challenge code as information corresponding to the identity information in the signature request when the first determining module 1003 determines that the received request is a signature request;

a sending module 1005 configured to send the logon challenge code and the signature challenge code, which are generated by the first generating module 1004, to the client side;

a searching module 1006 configured to search the working key and the logon challenge code in a logon verification request when the first determining module 1003 determines that the received request is the logon verification request; search for the working key and the signature challenge code corresponding to the identity information in a signature verification request when the first determining module 1003 determines that the request received is the signature verification request;

a first hash module 1007 configured to perform hash operation on the working key, which is found by searching by the searching module 1006, and the first usage code stored by the storing module 1001 to obtain the twelfth hash data; perform hash operation on the working key, which is found by searching by the searching module 1006, and the second usage code stored by the storing module 1001 to obtain the fourteenth hash data;

a second hash module 1008 configured to take the twelfth hash data, which is obtained by hash operation performed by the first hash module 1007, as a fourth computing key, perform hash operation on the fourth computing key, the fifth time information and the logon challenge code, which is found by searching of the search module 1006 to obtain the thirteenth hash data; take the fourteenth hash data obtained by the hash operation performed by the first hash module 1007 as the fifth computing key, perform hash operation on the fifth computing key, the sixth time information and the searched signature challenge code to obtain the fifteenth hash data;

a bit interception module 1009 configured to perform bit interception operation on the thirteenth hash data, which is obtained by performing hash operation by the second hash module 1008, to obtain the seventh bit interception result; perform bit interception operation on the fifteenth hash data, which is obtained by performing hash operation by the second hash module 1008, to obtain the eighth bit interception result;

the second determining module 1010, configured to take the seventh bit interception result, which is obtained by performing bit interception by the bit interception module 1009, as a logon password obtained by computing, determine whether the logon password obtained by computing matches the logon password obtained in the logon verification request; take the eighth bit interception result, which is obtained by performing interception obtained by the bit interception module 1009, as the signature password obtained by computing, determine whether the signature password obtained by computing matches the signature password obtained from the signature verification request; and the sending module 1005 further is configured to send information of successful verification to the client side when the second determining module 1010 determines that the logon password obtained by computing matches the logon password obtained from the logon verification request; send information of failed verification to the client side when the second determining module 1010 determines that the logon password obtained by computing does not match the logon password obtained from the logon verification request; send information of successful verification to the client side when the second determining module 1010 determines that the signature obtained by computing matches the signature password obtained from the signature verification request; send information of failed verification to the client side when the second determining module 1010 determines that the signature obtained by computing does not match the signature password obtained from the signature verification request.

Specifically, the first hash module 1007 specifically is configured to combine the working key found by searching by the searching module 1006 and the first usage code to be the twelfth data, fill the twelfth data to obtain a twelfth message, group the twelfth message and performs iterative compression on obtained grouping data and obtain the twelfth hash data; combine the working key found by searching by the searching module 1006 and the second usage code to be the fourteenth data, fill the fourteenth data to obtain a fourteenth message, group the fourteenth message and perform iterative compression on obtained grouping data and obtain the fourteenth hash data;

Specifically, the second hash module 1008 specifically is configured to combine the fourth computing key, the fifth time information and the logon challenge code found by searching to be the thirteenth data, fill the thirteenth data to obtain a thirteenth message, group the thirteenth message and performs iterative compression on obtained grouping data and obtain the thirteenth hash data; combine the fifth computing key, the sixth time information and the signature challenge code found by searching to be a fifteenth data, fill the thirteenth data to obtain a thirteenth message, group the thirteenth message and performs iterative compression on obtained grouping data and obtain the fifteenth hash data.

The bit interception module 1009 specifically is configured to group the thirteenth hash data to obtain a plurality of byte groups, transform respective byte groups into corresponding binary data by shifting and combining the bytes contained in the byte groups; perform modulo operation on the first preset value by using sum of all the binary data obtained by transforming to obtain a modulo result, perform modulo operation on the second preset value by using the obtained modulo result and obtain the seventh bit interception result; group the fifteenth hash data to obtain a plurality of byte groups, transform respective byte groups into corresponding binary data by shifting and combining the bytes contained in the byte groups; perform modulo operation on the first preset value by using sum of all the binary data obtained by transforming to obtain a modulo result, perform modulo operation on the second preset value by using the obtained modulo result and obtain the eighth bit interception result.

Further, the searching module 1006 is configured to search an original seed key corresponding to the identity information in an activation request when the first determining module 1003 determines that the received request is the activation request;

Correspondingly, the authentication server includes:

a second generating module configured to generate a first random number when the first determining module 1003 determines that the received request is the activation request;

the first hash module 1007 further configured to perform hash operation on the first random number and the original seed key found by searching by the search module 1006 to obtain a tenth hash data; and the bit interception module 1009 further configured to perform bit interception on the tenth hash data to obtain the sixth bit interception result.

The authentication server further includes:

a combining module configured to combine the sixth bit interception result obtained by bit interception performed by the bit interception module 1009 to obtain the activation code;

the third hash module configured to perform hash operation on the activation code obtained by combining by the combining module and the original seed key found by searching by the searching module 1006 and store the eleventh hash data as the working key corresponding to the identity information in the activation request; and the sending module 1005 further configured to send the activation code generated by the combining module to the client side.

Specifically, the first hash module 1007 specifically is configured to combine the first random number and the original seed key found by the searching by the searching module 1006 to the tenth data, fill the tenth data to obtain the tenth message, group the tenth message and perform iterative compression on obtained grouping data and obtain the tenth hash data.

The bit interception module 1009 is configured to group the tenth hash data, obtain a plurality of byte groups, transform respective byte groups into corresponding binary data by shifting and combining the bytes contained in the byte groups; perform modulo operation on a first preset value by using sum of all the binary data obtained by transforming to obtain a modulo result, perform modulo operation on a second preset value by using the obtained modulo result and obtain the sixth bit interception result.

Further, the storing module 1001 is configured to store the third usage code;

the search module 1006 is further configured to search the working key corresponding to the identity information of the unlock request when the third determining module 1003 determines that the received request is the unlock request;

the first hash module 1007 is further configured to perform hash operation on the working key searched by the search module 1006 and the third usage code stored by the storing module 1001 to obtain the sixth hash data;

the second hash module 1008 further takes the sixteenth hash data obtained by performing hash operation by the first hash module 1007 as the sixth computing key, performing hash operation on the sixth computing key and the unlock request code obtained from the unlock request to obtain the nineteenth hash data;

the bit interception module 1009 is further configured to perform bit interception on the nineteenth hash data to obtain the eleventh bit interception result;

the sending module further is configured to take the eleventh bit interception result, which is obtained by performing bit interception by the bit interception module 1009, as the unlock code and send the unlock code to the client side.

Specifically, the first hash module 1007 specifically is configured to combine the working key found by searching and the third usage code to the sixteenth data, fill the sixteenth data to obtain the sixteenth message, group the sixteenth message and perform iterative compression on obtained grouping data and obtain the sixteenth hash data.

the second hash module 1008, specifically is configured to combine the sixth computing key and the obtained unlock request to be a nineteenth data; fill the nineteenth data to obtain the nineteenth message, group the nineteenth message and perform iterative compression on obtained grouping data and obtain the nineteenth hash data.

The bit interception module 1009 specifically is configured to group the nineteenth hash data, obtain a plurality of byte groups, transform respective byte groups into corresponding binary data by shifting and combining the bytes contained in the byte groups; perform modulo operation on a first preset value by using sum of all the binary data obtained by transforming to obtain a modulo result, perform modulo operation on a second preset value by using the obtained modulo result and obtain the eleventh bit interception result.

Further, the storing module 1001 is further configured to store the third usage code;

the searching module 1006 is further configured to search for the working key corresponding to the identity information in a synchronization request when the first determining module 1003 determines that the received request is synchronization request;

the first hash module 1007 is further configured to perform hash operation on the working key found by searching of the searching module 1006 and the third usage code stored by the storing module 1001 to obtain a sixteenth hash data;

the second hash module 1008 is further configured to take the sixteenth hash data obtained by performing hash operation by the first hash module 1007 as the sixth computing key, perform hash operation on the sixth computing key and the seventh time information to obtain the seventeenth hash data;

the bit interception module 1009 is further configured to perform bit interception on the seventeenth hash data to obtain the ninth bit interception result;

the second determining module 1010 is further configured to take the ninth bit interception result, which is obtained by performing bit interception by the bit interception module 1009, as a first synchronization password, determine whether the first synchronization password matches a first synchronization code obtained from the synchronization request;

the sending module 1005 is further configured to send information of failed synchronization to the client side when the second determining module 1010 determines that the first synchronization password does not match the first synchronization code obtained from the synchronization request.

The authentication server further comprises:

a fourth hash module configured to perform hash operation on the sixth computing key and the eighth time information to obtain the eighteenth hash data when the second determining module 1010 determines that the first synchronization password matches the first synchronization code obtained from the synchronization request; and the bit interception module 1009 is further configured to perform bit interception on the eighteenth hash data to obtain a tenth bit interception result.

The authentication server further comprises:

a third determining module configured to take the tenth bit interception result, which is obtained by performing bit interception by the bit interception module 1009, as the second synchronization password, determine whether the second synchronization password matches the second synchronization code obtained from the synchronization request;

a fourth determining module configured to determine whether the time of successful verification of the second synchronization code is later than the time of successful verification of the first synchronization code when the third determining module determines that the second synchronization password matches the second synchronization code obtained from the synchronization request;

the obtaining module configured to, when the fourth determining module determines that time of successful verification of the second synchronization code is later than the time of successful verification of the first synchronization code, obtain a different value between the obtained system time and the time of successful authentication of the first synchronization code and store the different value as the token offset time corresponding to the identity information of the synchronization request; and the sending module 1005 further configured to send a message of failed synchronization to the client side when the third determining module determines that the second synchronization password does not match the second synchronization code obtained from the synchronization request; send message of successful synchronization to the client side when the third determining module determines that the second synchronization password matches the second synchronization code obtained from the synchronization request; send message of failed synchronization to the client side when the fourth determining module determines that the time of successful verification of the second synchronization code is not less than the time of successful verification of the first synchronization code.

Specifically, the first hash module 1007 specifically is configured to combine the working key found by searching by the authentication server and the third usage code to be a sixteenth data, fill the sixteenth data to obtain the sixteenth message, group the sixteenth message and perform iterative compression on obtained grouping data and obtain the sixteenth hash data.

The second hash module 1008 is specifically configured to combine the sixth computing key and the seventeenth time information to be a seventeenth data, fill the seventeenth data to obtain the seventeenth message, group the seventeenth message and perform iterative compression on obtained grouping data and obtain the seventeenth hash data.

The fourth hash module is specifically configure to combine the sixth computing key and the eighth time information to be an eighteenth data, fill the eighteenth data to obtain the eighteenth message, group the eighteenth message and perform iterative compression on obtained grouping data and obtain the eighteenth hash data.

The bit interception module 1009 is specifically configure to group the seventeenth hash data, obtain a plurality of byte groups, transform respective byte groups into corresponding binary data by shifting and combining the bytes contained in the byte groups; perform modulo operation on a first preset value by using sum of all the binary data obtained by transforming to obtain a modulo result, perform modulo operation on a second preset value by using the obtained modulo result and obtain the ninth bit interception result; and group the eighteenth hash data, obtain a plurality of byte groups, transform respective byte groups into corresponding binary data by shifting and combining the bytes contained in the byte groups; perform modulo operation on a first preset value by using sum of all the binary data obtained by transforming to obtain a modulo result, perform modulo operation on a second preset value by using the obtained modulo result and obtain the tenth bit interception result.

According to the present invention, the authentication server obtains corresponding computing key upon different usage codes, verifies dynamic passwords used in variety of application sites upon different usage codes, which reduces risks that the key used for generating a dynamic password is being stolen and improves security of a token verification system.

It can be understood by those skilled in the art that all of or part of the steps in the above embodiments can be realized by a program instructing relevant hardware, and the program can be stored in a computer readable storage media, and the steps in the above embodiments are executed when the program is executed; while the storage media includes: each media which can store program codes, such as ROM, RAM, a magnetic disk or an optical disc.

The described embodiments are only preferred embodiments of the application and the embodiments are not intended to limit the application. Any alternative solution or amended solution easily obtained by those skilled in the art based on the application should fall in the scope of protection of the application.

The invention claimed is:

1. A working method of a dynamic token, said method comprises the steps of:

A1) waiting, by the dynamic token, for a user to trigger a press key;

A2) determining, by the dynamic token, the press key triggered when the press key of the dynamic token is triggered; while executing Step A3 if the press key triggered is a first press key; executing Step A5 if the press key triggered is a second press key;

A3) obtaining, by the dynamic token, a logon challenge code input by the user, performing hash operation on a working key and a first usage code, which themselves are stored in the dynamic token; taking a first hash data obtained as a first computing key, performing hash operation on the first computing key, a first time information and said logon challenge code to obtain a second hash data;

A4) performing, by the dynamic token, bit interception on the second hash data, displaying a first bit interception result obtained as a logon password, going back to Step A1;

A5) obtaining, by the dynamic token, a signature challenge code input by the user, performing hash operation on the working key and a second usage code, which themselves are stored in the dynamic token, taking a third hash data obtained as a second computing key, performing hash operation on the second computing key, a second time information and the signature challenge code to obtain a fourth hash data; and A6) performing, by the dynamic token, bit interception on the fourth hash data, displaying a second bit interception result obtained as signature password, going back to Step A1, wherein
performing, by the dynamic token, bit interception on the second hash data specifically comprises:
grouping, by the dynamic token, the second hash data to obtain a plurality of byte groups, transforming respective byte groups into corresponding binary data by shifting and combining the bytes contained in respective byte groups; performing modulo operation on a first preset value by using sum of all the binary data obtained by transforming to a modulo result, performing modulo operation on a second preset value by using the obtained modulo result so as to obtain the first bit interception result; and
performing, by the dynamic token, bit interception on the fourth hash data specifically comprises:
grouping, by the dynamic token, the fourth hash data to obtain a plurality of byte groups, transforming respective byte groups into corresponding binary data by shifting and combining the bytes contained in respective byte groups; performing modulo operation on a first preset value by using sum of all the binary data obtained by transforming to a modulo result, performing modulo operation on a second preset value by using the obtained modulo result so as to obtain the second bit interception result.

2. The method of claim 1, wherein performing, by the dynamic token, hash operation on the working key and the first usage code, which themselves are stored in the dynamic token, specifically comprises:
combining, by the dynamic token, the working key with the first usage code, which themselves are stored in the dynamic token, so as to form a first data, filling the first data to obtain a first message, grouping the first message, performing iterative compression on an obtained group data so as to obtain the first hash data;
performing, by the dynamic token, hash operation on the first computing key, the first time information and the logon challenge code to obtain the second hash data specifically comprises:
combining, by the dynamic token, on the first computing key, the first time information with the logon challenge code so as to form a second data, filling the second data to obtain a second message, grouping the second message, performing iterative compression on the obtained group data so as to obtain the second hash data;
performing, by the dynamic token, hash operation the working key and the second usage code, which themselves are stored in the dynamic token, specifically comprises:
combining, by the dynamic token, the working key with the second usage code so as to form a third data, filling the third data to obtain a third message, grouping the third message, performing iterative compression on the obtained group data so as to obtain the third hash data; and
performing, by the dynamic token, hash operation on the second computing key, the second time information and the signature challenge code to obtain a fourth hash data specifically comprises:
combining, by the dynamic token, the second computing key, the second time information with the signature challenge code so as to form a fourth data, filling the fourth data to obtain a fourth message, grouping the fourth message, performing iterative compression on the obtained group data so as to obtain the fourth hash data.

3. The method of claim 1, wherein after determining, by the dynamic token, the press key being trigged to be a third press key, the method further comprises:
performing, by the dynamic token, hash operation on the working key and a third usage code which themselves are stored in the dynamic token, taking a fifth hash data obtained as a third computing key, performing hash operation on the third computing key and the third time information to obtain a sixth hash data, performing bit interception on the sixth hash data to obtain a third bit interception result; performing hash operation on the third computing key and a fourth time information to obtain a seventh hash data; performing bit interception on the seventh hash data to obtain a fourth bit interception result; displaying the third bit interception result and the fourth bit interception result as a first synchronization code and a second synchronization code respectively, and going back to Step A1.

4. The method of claim 1, wherein the method further comprises:
obtaining, by the dynamic token, an activation code input by a user, performing hash operation on the activation code and a self-stored original seed key, storing a ninth hash data obtained as the working key, setting a startup password and storing the set startup password.

5. The method of claim 3, wherein performing, by the dynamic token, hash operation on the working key and the third usage code, which themselves are stored in the dynamic token specifically comprises:
combining, by the dynamic token, the working key with the third usage code, which themselves are stored in the dynamic token to form a fifth data, filling the fifth data to obtain a fifth message, grouping the fifth message, performing iterative compression on the obtained group data so as to obtain the fifth hash data;
performing, by the dynamic token, hash operation on the third computing key and the third time information to obtain a sixth hash data specifically comprises:
combining, by the dynamic token, the third computing key with the third time information to form a sixth data, filling the sixth data to obtain a sixth message, grouping the sixth message, performing iterative compression on the obtained group data so as to obtain the sixth hash data; and
performing, by the dynamic token, hash operation on the third computing key and the fourth time information to obtain a seventh hash data specifically comprises:
combining, by the dynamic token, the third working key with the fourth time information to form a seventh data, filling the seventh data to obtain a seventh message, grouping the seventh message, performing iterative compression on the obtained grouping data so as to obtain the seventh hash data.

6. The method of claim 3, wherein performing, by the dynamic token, bit interception on the sixth hash data to obtain the third bit interception result specifically comprises:
grouping, by the dynamic token, the sixth hash data to obtain a plurality of byte groups, transforming respective byte groups into corresponding binary data by shifting and combining the bytes contained in respective byte groups; performing modulo operation on a first preset value by using sum of all the binary data obtained by transforming to obtain a modulo result, performing modulo operation on a second preset value by using the obtained modulo result so as to obtain the third bit interception result; and performing, by the dynamic token, bit interception on the seventh hash data to obtain the fourth bit interception result specifically comprises:

grouping, by the dynamic token, the seventh hash data to obtain a plurality of byte groups, transforming respective byte groups into corresponding binary data by shifting and combining the bytes contained in respective byte groups; performing modulo operation on a first preset value by using sum of all the binary data obtained by transforming to obtain a modulo result, performing modulo operation on a second preset value by using the obtained modulo result so as to obtain the fourth bit interception result.

7. The method of claim 4, wherein performing, by the dynamic token, hash operation on the activation code and the self-stored original seed key specifically comprises:

combining, by the dynamic token, the activation code with the self-stored original seed key to form a ninth data, filling the ninth data to obtain a ninth message, grouping the ninth message, performing iterative compression on the obtained grouping data so as to obtain the ninth hash data.

8. The method of claim 4, wherein before Step A1, the method further comprises:

B1) prompting, by the dynamic token, the user to input a startup password;

B2) determining, by the dynamic token, whether the obtained startup password is identical to its self-stored startup password when the startup password input by the user is input, if yes, initializing times of startup failure from the user and executing Step A1; otherwise, executing Step B3;

B3) updating, by the dynamic token, the times of startup failure, determining whether the times of startup failure equals to a first preset times, if yes, executing Step B4; otherwise, going back to Step B1;

B4) generating and displaying, by the dynamic token, an unlock request code, and prompting the user to input a unlock code;

B5) performing, by the dynamic token, hash operation on the working key and the third usage code, which themselves are stored in the dynamic token when the unlock code input by the user is obtained, taking the obtained fifth hash data as the third computing key, performing hash operation on the third computing key and the unlock request code to obtain an eighth hash data; and B6) performing, by the dynamic token, bit interception on the eighth hash data to obtain a fifth bit interception result, determining whether the fifth bit interception result is identical to the unlock code, if yes, displaying information of successful unlock and resetting the startup password, storing the reset startup password and executing Step A1; otherwise, displaying information of unlock failure and going back to Step B4.

9. The method of claim 8, wherein after determining, by the dynamic token, that the fifth bit interception result is identical to the unlock code, the method further comprises:

initializing, by the dynamic token, times of unlock failure; and after determining, by the dynamic token, that the fifth bit interception result is not identical to the unlock code, the method further comprises:

updating, by the dynamic token, the times of unlock failure, determining whether the times of unlock failure equals to a second preset times, if yes, clearing the self-stored original seed key and the self-stored working key, displaying information that the dynamic token is being self-destroyed and ending the procedure; otherwise, going back to Step B4.

10. The method of claim 8, before Step B1, the method further comprises:

powering up, by the dynamic token, determining whether the dynamic token itself is locked, if yes, executing Step B4; otherwise, executing Step B1.

11. The method of claim 8, wherein performing, by the dynamic token on the working key and the third usage code, which themselves are stored in the dynamic password specifically comprises:

combining, by the dynamic token, the working key with the third usage code, which themselves are stored in the dynamic token to form a fifth data, filling the fifth data to obtain a fifth message, grouping the fifth message, performing iterative compression on the obtained group data so as to obtain the fifth hash data; and performing, by the dynamic token, hash operation on the third computing key and the unlock request code to obtain the eighth hash data specifically comprises:

combining, by the dynamic token, the third computing key with the unlock request code to form the eighth data, filling the eighth data to obtain an eighth message, grouping the eighth message, performing iterative compression on the obtained group data so as to obtain the eighth hash data.

12. The method of claim 8, wherein performing, by the dynamic token, bit interception on the eighth hash data to obtain a fifth bit interception result specifically comprises:

grouping, by the dynamic token, the eighth hash data to obtain a plurality of byte groups, transforming respective byte groups into corresponding binary data by shifting and combining the bytes contained in respective byte groups; performing modulo operation on a first preset value by using sum of all the binary data obtained by transforming to obtain a modulo result, performing modulo operation on a second preset value by using the obtained modulo result so as to obtain the fifth bit interception result.

13. A dynamic token, said dynamic token comprises:

a means for storing a working key, a first usage code and a second usage code;

a means for obtaining a logon challenge code and a signature challenge code input by the user;

a means for detecting press keys;

a means for first determining a press key triggered when the means for detecting detects that the press key is triggered;

a means for performing first hash hash operation on the working key and the first usage code stored by the means for storing to obtain a first hash data when the means for first determining determines that the press key triggered is a first press key; and perform hash operation on the working key and the second usage code stored by the means for storing to obtain a third hash data when the means for first determining determines that the press key trigged is a second key;

a means for performing second hash to take a first hash data, which is obtained by the hash operation performed by the means for performing first hash, as a first computing key, perform hash operation on the first computing key, a first time information and the logon challenge code obtained by the means for obtaining to obtain a second hash data; take the third hash data obtained by the means for performing first hash as the second computing key, perform the second computing key, a second time information and the signature challenge code obtained by the means for obtaining to obtain the fourth hash data;

a means for intercepting to perform bit interception on the second hash data, which is obtained by the hash operation performed by the means for performing second hash, to obtain a first bit interception result; and perform bit interception on the fourth hash data obtained by the means for performing second hash to obtain a second bit interception result; and a means for displaying to take the first bit interception result, which is obtained by bit interception performed by the means for intercepting, as the logon password to display; and take the second interception result, which is obtained by bit interception performed by the means for intercepting bit interception, as the signature password to display, the means for intercepting bit interception is to group the second hash data, obtain a plurality of byte groups, transform respective byte groups into corresponding binary data by shifting and combining the bytes contained in the byte groups; perform modulo operation on a first preset value by using sum of all the binary data obtained by transforming to a modulo result, perform modulo operation on a second preset value by using the obtained modulo result, so as to obtain the first bit interception result; and group the fourth hash data to obtain a plurality of byte groups, transform respective byte groups into corresponding binary data by shifting and combining the bytes contained in the byte groups; perform modulo operation on a first preset value by using sum of all the binary data obtained by transforming to a modulo result, perform modulo operation on a second preset value by using the obtained modulo result, so as to obtain the second bit interception result.

14. The dynamic token of claim 13, wherein the means for performing first hash is specifically to combine the working key with the first usage code to from a first data, fill the first data to obtain a first message, group the first message, and perform iterative compression on a grouped data, so as to obtain a first hash data; and combine the working key with the second usage code to from a third data, fill the third data to obtain a third message, group the third message and perform iterative compression on a grouped data, so as to obtain a third hash data;

the means for performing second hash is configured to combine the first computing key, the first time information with the logon challenge code to form a second data, fill the second data to obtain a second message, group the second message and perform iterative compression on the grouped data, so as to obtain a second hash data; and combine the second computing key, the second time information with the signature challenge code to form a fourth data, fill the fourth data to obtain a fourth message, group the fourth message, perform iterative compression on the grouped data, so as to obtain a fourth hash data.

15. The dynamic token of claim 13, wherein the means for storing is further to store the third usage code;

the means for performing first hash is further to perform hash operation on the working key and the third usage code, which are stored by the means for storing, to obtain the fifth hash data when the means for first determining determines that the press key triggered is the third press key;

the means for performing second hash is further to take the fifth hash data, which is obtained from hash operation performed by the means for performing first hash, as the third computing key, perform the third computing key and the third time information to obtain the sixth hash data; perform hash operation on the third computing key and the fourth time information to obtain the seventh hash data;

the means for intercepting bit interception is further to perform bit interception on the sixth hash data to obtain the third interception result; and perform bit interception on the seventh hash data to obtain the fourth bit interception result; and the means for displaying is further to take the third bit interception result and the fourth bit interception result as the first synchronization code and the second synchronization code to display, respectively.

16. The dynamic token of claim 13, wherein the means for storing is to store the original seed key and the third usage code;

the means for obtaining is to obtain an activation code input by the user; and the dynamic token further comprises:

a means for performing third hash to perform hash operation on the activation code and the original seed key, store the obtained ninth hash data as the working key; and a means for setting to set the startup password after the means for performing third hash stores the working key, and store the startup password in the storing module.

17. The dynamic token of claim 15, wherein the means for performing first hash is specifically to combine the working key with the third usage code so as to form the fifth data, fill the fifth data to obtain the fifth message, group the fifth message and perform iterative compression on the grouped data, so as to obtain the fifth hash data;

the means for performing second hash is to combine the third computing key with the third time information so as to form the sixth data, fill the sixth data to obtain the sixth message, group the sixth message and perform iterative compression on the grouped data and obtain the sixth hash data; and combine the third computing key with the fourth time information so as to form the seventh data, fill the seventh data to obtain the seventh message, group the seventh message and perform iterative compression on the grouped data, so as to obtain the seventh hash data.

18. The dynamic token of claim 15, wherein the means for intercepting bit interception is specifically to group the sixth hash data, obtain a plurality of byte groups, transform respective byte groups into corresponding binary data by shifting and combining the bytes contained in the byte groups; perform modulo operation on the first preset value by using sum of all the binary data obtained by transforming to a modulo result, perform modulo operation on the second preset value by using the obtained modulo result, so as to obtain the third bit interception result; and group the seventh hash data to obtain a plurality of byte groups, transform respective byte groups into corresponding binary data by shifting and combining the bytes contained in the byte groups; perform modulo operation on the first preset value by using sum of all the binary data obtained by transforming to a modulo result, perform modulo operation on the second preset value by using the obtained modulo result, so as to obtain the fourth bit interception result.

19. The dynamic token of claim 16, wherein
the means for performing third hash is specifically to combine the activation code with the original see key to form the ninth data, fill the ninth data to obtain the ninth message, group the ninth message and perform iterative compression on the grouped data, so as to obtain the ninth hash data.

20. The dynamic token of claim 16, wherein
the means for displaying is to prompt the user to input a startup password;
the means for obtaining is to obtain the startup password input by the user; and
the dynamic token further includes:
a means for second determining to determine whether the startup password obtained by the means for obtaining is identical to the startup password stored by the means for storing;
a means for first initializing to initialize times of startup failure when the means for second determining determines that the startup password obtained by the means for obtaining is identical to the startup password stored by the means for storing;
a means for first updating to update the times of startup failure when means for second determining determines that the startup password obtained by the means for obtaining is not identical to the startup password stored by the means for storing;
a means for third determining to determine whether the times of startup failure updated by the means for first updating is equal to a first preset times; and
a means for generating to generate an unlock request code when the means for third determining determines that the times of startup failure is equal to the first preset times,
in which the means for displaying further is to display the unlock request code generated by the means for generating and prompt the user to input an unlock code;
the means for obtaining further is to obtain the unlock code input by the user;
the means for performing first hash further is configured to perform hash operation on the working key stored by the means for storing and the third usage code to obtain the fifth hash data;
the means for performing second hash further is configured to take the fifth hash data as the third computing key, perform hash operation on the third computing key and the unlock request code to obtain the eighth hash data;
the means for intercepting bit interception is configured to perform bit interception on the eighth hash data to obtain the fifth bit interception result;
the means for fourth determining is to determine whether the fifth bit interception result is identical to the unlock code;
the means for displaying further is to display information of successful unlock when the means for fourth determining determines that the fifth bit interception result is identical to the unlock code; or display information of failed unlock when the means for fourth determining determines that the fifth bit interception result is not identical to the unlock code; and
the means for setting is configured to reset the startup password and store the reset startup password when the means for fourth determining determines that the fifth bit interception result is identical to the unlock code.

21. The dynamic token of claim 20, wherein the dynamic token further comprises:
a means for second initializing to initialize the times of failed unlock when the means for fourth determining determines that the fifth bit interception result is identical to the unlock code;
a means for second updating to update the time of failed unlock when the means for fourth determining determines that the fifth bit interception result is not identical to the unlock code;
a means for fifth determining to determine whether the times of failed unlock equals to a second preset times, trigger the generating module to generate the unlock request code when the means for fifth determining determines that the times of failed unlock is not equal to the second preset times;
a means for clearing to clear the original seed key and the working key stored in the storing module when the means for fifth determining determines that the times of failed unlock is equal to the second preset times; and
the means for displaying further is to display information that the token is self-destroyed when the means for fifth determining determines that the times of failed unlock equals to the second preset times.

22. The dynamic token of claim 20, wherein the dynamic token further comprises:
a means for sixth determining to determine whether the dynamic token is locked when the dynamic token is powered up; trigger the means for generating to generate the unlock request code when the means for sixth determining determines that the dynamic token is locked; or trigger the means for displaying to prompt the user to input the startup password when the means for sixth determining determines that the dynamic token is not locked.

23. The dynamic token of claim 20, wherein
the means for performing first hash is to combine the working key with the third usage code so as to form the fifth data, fill the fifth data to obtain the fifth message, group the fifth message and perform iterative compression on the grouped data, so as to obtain the ninth hash data; and
the means for performing second hash is specifically to combine the third computing key with the unlock request code to form the eighth data, fill the eighth data to obtain the eighth message, group the eighth message and perform iterative compression on the grouped data, so as to obtain the eighth hash data.

24. The dynamic token of claim 20, wherein
the means for intercepting bite interception is to group the eighth hash data to obtain a plurality of byte groups, transform respective byte groups into corresponding binary data by shifting and combining the bytes contained in the byte groups; perform modulo operation on the first preset value by using sum of all the binary data obtained by transforming to a modulo result, perform modulo operation on the second preset value by using the obtained modulo result, so as to obtain the fifth bit interception result.

* * * * *